US012687516B2

(12) United States Patent
Van Roy et al.

(10) Patent No.: US 12,687,516 B2
(45) Date of Patent: Jul. 21, 2026

(54) ELECTRIC FIELD GRADIENT FOCUSING DEVICE

(71) Applicants: IMEC VZW, Leuven (BE); Katholieke Universiteit Leuven, KU LEUVEN R&D, Leuven (BE)

(72) Inventors: Willem Van Roy, Bierbeek (BE); Chengxun Liu, Heverlee (BE); Tinne De Moor, Kessel-Lo (BE)

(73) Assignee: Imec VZW, Leuven (BE)

( * ) Notice: Subject to any disclaimer, the term of this patent is extended or adjusted under 35 U.S.C. 154(b) by 566 days.

(21) Appl. No.: 18/068,763

(22) Filed: Dec. 20, 2022

(65) Prior Publication Data

US 2023/0204540 A1 Jun. 29, 2023

(30) Foreign Application Priority Data

Dec. 23, 2021 (EP) .................................... 21217647

(51) Int. Cl.
*G01N 27/447* (2006.01)
*B01L 3/00* (2006.01)

(52) U.S. Cl.
CPC .. *G01N 27/44791* (2013.01); *B01L 3/502761* (2013.01); *G01N 27/44713* (2013.01); *B01L 2200/0652* (2013.01); *B01L 2300/0645* (2013.01); *B01L 2300/0838* (2013.01); *B01L 2400/0406* (2013.01); *B01L 2400/0421* (2013.01)

(58) Field of Classification Search
CPC ....... G01N 27/44791; G01N 27/44713; G01N 27/4476; B01L 3/502761; B01L 2200/0652; B01L 2300/0645; B01L 2300/0838; B01L 2400/0406; B01L 2400/0421
See application file for complete search history.

(56) References Cited

U.S. PATENT DOCUMENTS 6,749,735 B1    6/2004  Le Febre
7,141,152 B2 *  11/2006 Le Febre .......... G01N 30/0005
                                        204/600

(Continued)

FOREIGN PATENT DOCUMENTS

WO    WO-2009027970 A2 *  3/2009  ....... G01N 27/44795
WO    WO-2010019684 A2 *  2/2010  ......... B01F 13/0076

(Continued)

OTHER PUBLICATIONS

Stoterau et al., "Novel Configuration for an AC Electroosmotic Pump Driven by AC Voltage with DC Voltage Bias for Bi-Directionality and Increased Volumetric Flow Rates," 2010, 2010 18th Biennial University/Government/Industry Micro/Nano Symposium, pp. 1-6 (Year: 2010).*

(Continued)

*Primary Examiner* — Shizhi Qian
(74) *Attorney, Agent, or Firm* — McDonnell Boehnen Hulbert & Berghoff LLP

(57) ABSTRACT

An electric field gradient focusing device is provided that includes: (i) a fluidic channel having an inlet and an outlet for a fluid, (ii) a first actuator configured to induce a fluid flow in the fluidic channel from the inlet to the outlet via AC electroosmosis, and (iii) a second actuator configured to generate a DC electric field gradient along at least part of the fluidic channel.

19 Claims, 9 Drawing Sheets

(56) References Cited

U.S. PATENT DOCUMENTS

| | | | | |
|---|---|---|---|---|
| 2007/0235335 A1* | 10/2007 | Strand | .............. | G01N 27/44795 |
| | | | | 204/518 |
| 2011/0220501 A1* | 9/2011 | Witkowski | ....... | G01N 27/44713 |
| | | | | 204/457 |
| 2012/0138468 A1* | 6/2012 | Sivan | ................... | B01D 61/445 |
| | | | | 204/644 |
| 2014/0131204 A1 | 5/2014 | Chou et al. | | |
| 2017/0274378 A1 | 9/2017 | Turner et al. | | |
| 2018/0346975 A1* | 12/2018 | Marczak | ......... | G01N 27/44721 |

FOREIGN PATENT DOCUMENTS

| | | | |
|---|---|---|---|
| WO | 2010019684 | A3 | 5/2010 |
| WO | 2019195196 | A1 | 10/2019 |

OTHER PUBLICATIONS

Kelly et al., "Electric field gradient focusing," 2005, J. Sep. Sci., vol. 28, pp. 1985-1993 (Year: 2005).*

Greenlee et al., "Protein Focusing in a Conductivity Gradient," 1998, Biotechnol. Prog., vol. 14, pp. 300-309 (Year: 1998).*

Paustian et al., Microfluidic Microdialysis: Spatiotemporal Control over Solution Microenvironments Using Integrated Hydrogel Membrane Microwindows, Physical Review X, 2013, 3, 041010 (Year: 2013).*

Extended European Search Report and Written Opinion, Application No. EP 21217647.3, mailed May 3, 2022, 10 pages.

Manshadi, Mohammad KD, Mehdi Mohammadi, Mohammad Zarei, Mahsa Saadat, and Amir Sanati-Nezhad. "Induced-charge electrokinetics in microfluidics: a review on recent advancements." Journal of Micromechanics and Microengineering 30, No. 11 (2020): 113001.

Bazant, M. Z. "AC electro-osmotic flow." Encyclopedia of microfluidics and nanofluidics, vol. Part 1 (2008).

Squires, Todd M., and Martin Z. Bazant. "Induced-charge electro-osmosis." Journal of Fluid Mechanics 509 (2004): 217-252.

Bazant, Martin Z., and Yuxing Ben. "Theoretical prediction of fast 3D AC electro-osmotic pumps." Lab on a Chip 6, No. 11 (2006): 1455-1461.

Urbanski, John Paul, Jeremy A. Levitan, Damian N. Burch, Todd Thorsen, and Martin Z. Bazant. "The effect of step height on the performance of three-dimensional ac electro-osmotic microfluidic pumps." Journal of colloid and interface science 309, No. 2 (2007): 332-341.

Urbanski, John Paul, Todd Thorsen, Jeremy A. Levitan, and Martin Z. Bazant. "Fast ac electro-osmotic micropumps with nonplanar electrodes." Applied Physics Letters 89, No. 14 (2006): 143508.

Delgado, J. M. P. Q. "A critical review of dispersion in packed beds." Heat and mass transfer 42, No. 4 (2006): 279-310.

* cited by examiner

Concentration distribution for a pressure driven flow

Concentration distribution for a pressure driven flow

Concentration distribution for a pressure driven flow

ELECTRIC FIELD GRADIENT FOCUSING DEVICE

CROSS-REFERENCE TO RELATED APPLICATIONS

The present application is a non-provisional patent application claiming priority to European Patent Application No. EP 21217647.3, filed Dec. 23, 2021, the contents of which are hereby incorporated by reference.

TECHNICAL FIELD

The present invention relates to the field of particle separation, and more in particular to methods and devices for separating biomolecules.

BACKGROUND

Capillary electrophoresis, liquid chromatography, and related techniques are commonly used to separate particles, and/or to enrich certain particle fractions. The particles may comprise, for example, ions and (bio)molecules, such as proteins or DNA. Separation can, for example, be due to a difference in mass (m), mass-to-charge ratio (m/z) or interaction with a surface. In these techniques, typically, different particle species move at different speeds through a column or channel. Thereby, at a fixed time, the positions of different particle species injected simultaneously may be different. Alternatively, at a fixed position (e.g., the exit of the column) the time of passage of different particle species may be different.

In one type of technique for separating particles, particles are focused towards a focus region. In such techniques, the injection of the particles can be continuous. If the particle moves out of the focus region, a restoring force is applied to the particle to move the particle back towards the focus region. An example of a focusing technique is Electric Field Gradient Focusing (EFGF). In EFGF, a charged particle is present in a fluid in a fluidic channel. Two forces act on the charged particle. The first force acting on the charged particle is a drag force by the fluid that is continuously flowing from the inlet to the outlet of the fluidic channel. The second force acting on the charged particle is a position-dependent electrophoretic force, created by a DC electric field gradient. The second force typically acts in the opposite direction to the drag force, i.e., from the outlet to the inlet of the fluidic channel. The second force is position-dependent, and typically increases from the inlet to the outlet (by a field strength that increases from inlet to outlet). The first and second forces acting on the charged particle balance out at a certain position along the channel, in a focus region. The charged particle may be stationary at that position. In other words, charged particles of the type of the charged particle may accumulate, i.e., focus, in the focus region. A different type of charged particle, with a different drag coefficient and/or a different electrophoretic mobility, may accumulate (i.e., focus) at a different position. Hence, the focus region may be specific for each type of charged particle. Thereby, different types of charged particles may be separated from each other.

In the state of the art, a fluid flow is typically achieved by generating a difference in pressure between the inlet and outlet of the fluidic channel. For example, a fluidic pump may be fluidically connected to the inlet of the fluidic channel. In that case, Poiseuille flow may be assumed. Such a Poiseuille fluid flow profile is parabolic with zero flow velocity at walls of the fluidic channel and a maximum flow velocity in the center of the fluidic channel. The zero-flow velocity at the walls is due to local retardation of the fluid flow at the walls due to interaction between the fluid and the wall. As a result, a drag force acting on charged particles in the fluidic channel varies over the channel cross-section. The drag force is negligible near the walls of the fluidic channel and maximum near the center of the fluidic channel. On the other hand, the electrophoretic force acting on the charged particles, typically does not vary within the cross-section. Ideally, the electric field gradient only varies along the length of the fluidic channel. As a result, a first charged particle flowing in the center of the channel will be stationary at a different longitudinal position in the fluidic channel than a second charged particle of the same type as the first charge particle, flowing closer to the channel walls. This phenomenon, known as Taylor dispersion, may harm the focusing resolution.

Better separation of different charged particle types may be achieved when a resolution is higher. There is, therefore, a need in the art for EFGF methods and devices that may achieve a high resolution.

SUMMARY

Apparatus and methods described herein provide improved electric field gradient focusing. Embodiments described herein, by using AC electroosmosis, generate a fluid flow having a flat flow profile in a cross-section taken along the length of the fluidic channel. Accordingly, a focusing resolution of such embodiments is not limited by the fluid flow. These embodiments are beneficially compatible with generating a DC electric field gradient. Accordingly, the systems and methods described herein allow a high resolution of separation to be achieved.

In a first aspect, an electric field gradient focusing device is provided that includes: (i) a fluidic channel having an inlet and an outlet for a fluid, (ii) a first actuator configured to induce a fluid flow in the fluidic channel from the inlet to the outlet via AC electroosmosis, and (iii) a second actuator configured to generate a DC electric field gradient along at least part of the fluidic channel. The generated gradient can be such that the DC electric field is larger closer to the outlet than closer to the inlet.

In a second aspect, a method for separating a first charged particle from one or more other charged particles in a mixture of charged particles present in a fluid is provided that includes: (i) introducing the fluid into a fluidic channel having an inlet and an outlet for the fluid, (ii) inducing a fluid flow in the fluidic channel from the inlet to the outlet via AC electroosmosis, (iii) generating a DC electric field gradient along at least part of the fluidic channel, wherein steps (ii) and (iii) overlap in time, wherein the fluidic channel includes a focus region for the first charged particle, an upstream region contiguous to the focus region, and a downstream region contiguous to the focus region, wherein the DC electric field gradient includes a first DC electric field in the upstream region, a third DC electric field in the downstream region, and a second DC electric field, intermediate between the first and third DC electric field, in the focus region, and wherein the first DC electric field, the third DC electric field, and the fluid flow are adapted so as to translocate the first charged particle towards the focus region.

Example aspects of the present disclosure are set out in the accompanying independent and dependent claims. Features from the dependent claims may be combined with features of the independent claims and with features of other dependent claims as appropriate and not merely as explicitly set out in the claims.

The embodiments described herein result in more efficient, stable, and reliable devices of this nature.

The above and other characteristics, features, and benefits of the present disclosure will become apparent from the following detailed description, taken in conjunction with the accompanying drawings, which illustrate, by way of example, the principles of embodiments described herein. This description is given for the sake of example only, without limiting the scope of the claims. The reference figures quoted below refer to the attached drawings.

Figure 1:
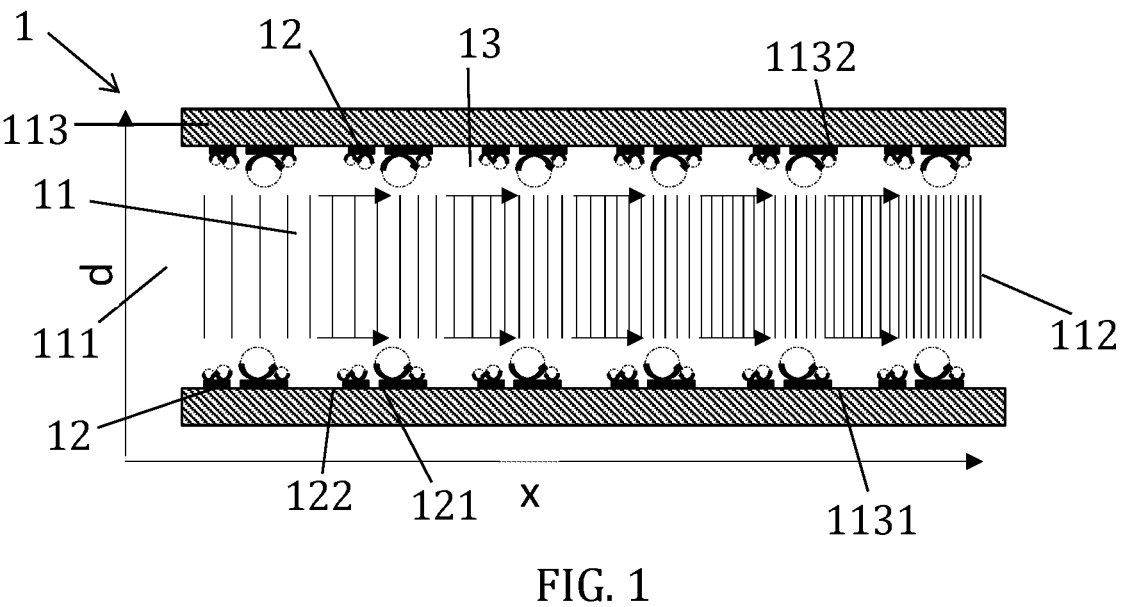
FIG. 1 is a vertical cross-section along the fluidic channel of an electric field gradient focusing device according to an example embodiment.

In the different figures, the same reference signs refer to the same or analogous elements.

DETAILED DESCRIPTION

Embodiments provided herein will be described with respect to particular example and with reference to certain drawings but the claims are not limited thereto. The drawings described are schematic and are non-limiting. In the drawings, the size of some of the elements may be exaggerated and not drawn on scale for illustrative purposes. The dimensions and the relative dimensions do not necessarily correspond to actual reductions to practice of the embodiments described herein.

Furthermore, the terms first, second, third, and the like in the description and in the claims, are used for distinguishing between similar elements and not necessarily for describing a sequence, either temporally, spatially, in ranking, or in any other manner. It is to be understood that the terms so used are interchangeable under appropriate circumstances and that the embodiments described herein are capable of operation in other sequences than described or illustrated herein.

Moreover, the terms top, bottom, over, under, and the like in the description and the claims are used for descriptive purposes and not necessarily for describing relative positions. It is to be understood that the terms so used are interchangeable under appropriate circumstances and that the embodiments described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps, or components as referred to, but does not preclude the presence or addition of one or more other features, integers, steps, or components, or groups thereof. The term "comprising" therefore covers the situation where only the stated features are present and the situation where these features and one or more other features are present. The word "comprising" according to the present disclosure therefore also includes as one embodiment that no further components are present. Thus, the scope of the expression "a device comprising means A and B" should not be interpreted as being limited to devices consisting only of components A and B. It means that with respect to the present disclosure, the only relevant components of the device are A and B.

Similarly, it is to be noticed that the term "coupled", also used herein, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure, or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent to one of ordinary skill in the art from this disclosure, in one or more embodiments.

Similarly, it should be appreciated that in the description of exemplary embodiments of the present disclosure, various features of the disclosure are sometimes grouped together in a single embodiment, figure, or description thereof for the purpose of streamlining the disclosure and aiding in the understanding of one or more of the various aspects disclosed herein. This method of disclosure, however, is not to be interpreted as reflecting an intention that the claimed embodiments require more features than are expressly recited in each claim.

Furthermore, while some embodiments described herein include some but not other features included in other embodiments, combinations of features of different embodiments are meant to be within the scope of the present disclosure, and form different embodiments, as would be understood by those in the art. For example, in the following claims, any of the claimed embodiments can be used in any combination.

In the description provided herein, numerous specific details are set forth. However, it is understood that embodiments of the present disclosure may be practiced without these specific details. In other instances, well-known methods, structures, and techniques have not been shown in detail in order not to obscure an understanding of this description.

As used in the context of this description, a peak corresponds to a curve that describes a particle density, or, equivalently, a probability that the particle is present at a particular location, as a function of location. For example, the peak may correspond to the particle density or probability along a fluidic channel in a direction from an inlet to an outlet of the fluidic channel. The peak may have a maximum, which corresponds to a maximum in the particle density or probability. Each peak may have a width, such as a full-width-at-half-maximum (FWHM) or a standard deviation.

As used in the context of this description, resolution refers to a measure of separation of different peaks of particles. Two different types of charged particles may each focus in a different region of a fluidic channel, each type of particle forming a peak of particles. The peaks are separated from each other by a distance. The resolution is typically the smallest distance between the peaks that still allows for resolution, i.e., distinction, of each peak. A better resolution may correspond to a smaller FWHM or standard deviation of the peaks. A worse resolution may correspond to a larger FWHM or standard deviation of the peaks.

In a first aspect, the present disclosure includes an electric field gradient focusing device that includes: i) a fluidic channel having an inlet and an outlet for a fluid, ii) a first actuation means, i.e., a first actuator, configured for inducing a fluid flow in the fluidic channel from the inlet to the outlet via AC electroosmosis, and iii) a second actuation means, i.e., a second actuator, configured for generating a DC electric field gradient along at least part of the fluidic channel, i.e. along at least part of the length of the fluidic channel.

In example embodiments, the electric field gradient focusing device is configured so that, in operation, the fluidic channel comprises a focus region for the first charged particle, an upstream region contiguous to the focus region, and a downstream region contiguous to the focus region, wherein the DC electric field gradient comprises a first DC electric field in the upstream region, a third DC electric field in the downstream region, and a second DC electric field, intermediate between the first and third DC electric field, in the focus region, and wherein the first DC electric field, the third DC electric field, and the fluid flow are adapted so as to translocate the first charged particle towards the focus region In example embodiments, the first actuation means comprises a first array of electrode pairs along a wall of the fluidic channel, wherein the first actuation means comprises first conductors configured to electrically connect the first array of electrode pairs to at least an AC power source in such a way that an AC electric field can be generated between a first electrode and a second electrode of each electrode pair. In embodiments, the at least an AC power source is connected to the first array of electrode pairs. In embodiments, each AC power source is connected to the first electrode of each of at least two electrode pairs of the first array. In embodiments, the first actuation means comprises circuitry adapted for inducing the fluid flow. In preferred embodiments, the first actuation means being configured for inducing the fluid flow is configured so that each electrode pair is asymmetrical (preferably geometrically asymmetrical) with respect to a plane (of asymmetry) perpendicular to a direction from the inlet to the outlet and situated at mid-distance between both electrodes. In embodiments wherein both electrodes are separated from each other by a gap, the mid-distance may be located halfway along the gap. In embodiments wherein both electrodes touch each other at an interface, the plane may be located at the interface. This asymmetric arrangement may, for example, comprise a difference in surface area between both electrodes, a difference in material between both electrodes, or a difference in distance between a (e.g., top) surface of each electrode and a same wall of the channel (e.g., facing the surface, or on which the electrodes are present), as described below. Preferably, this asymmetric arrangement may be a geometrical asymmetric arrangement, for example, comprising a difference in surface area between both electrodes, or a difference in distance between a (e.g., top) surface of each electrode and a same wall of the channel (e.g., facing the surface, or on which the electrodes are present), as described below.

In example embodiments, the first actuation means may comprise a first array of electrode pairs along a wall of the fluidic channel, wherein the first actuation means comprises first conductors configured to electrically connect the first array of electrode pairs to at least an AC power source in such a way that an AC electric field can be generated between a first electrode and a second electrode of each electrode pair, and wherein each electrode pair is composed of electrodes differing by their geometry or by their elevation with respect to the wall. For instance, the electrodes differing by their geometry may have different surface areas. The electrode differing by their elevation with respect to the wall may be characterized by a difference in distance between a (e.g., top) surface of each electrode and a same wall of the channel (e.g., facing the surface, or on which the electrodes are present), as described below.

AC electroosmosis, i.e., induced charge electroosmosis, is a known technique for inducing a fluid flow, see e.g., Bazant M. Z. (2008) AC Electro-Osmotic Flow, in: Encyclopedia of Microfluidics and Nanofluidics, Springer, Boston, MA. The effect of the AC electric field is now described for a part of the AC electric field cycle, e.g., when the AC electric field is at a maximum. The AC electric field accumulates ions of a first type and/or depletes ions of a second type in the liquid just above the surface of the first electrode, and thereby generates an ion imbalance. These ions have a first charge sign. At the same time, the AC electric field also accumulates ions of a second type in the liquid just above the surface of the second electrode. These ions have a second charge sign, opposite to the first charge sign. Subsequently, a component of the AC electric field near, and parallel to, the surface of the first electrode induces the movement of the first ions, over the first electrode. A component of the AC electric field near, and parallel to, the surface of the second electrode induces the movement of the second ions, over the second electrode These movements pull the fluid along tangentially. As a result, the fluid flows over the electrodes. The flow of the fluid over the first electrode and the flow of the fluid over the second electrode have opposite directions and cancel each other if the symmetry between both electrodes is not broken. The effect of the AC electric field, half a cycle later, e.g., when the AC electric field is at a minimum, is opposite, in that ions of the second type accumulate and/or ions of the first type are depleted above the first electrode, and ions of the first type accumulate and/or ions if the second type are depleted above the second electrode.

In example embodiments, the first electrode and the second electrode are adapted so that, on application of the AC electric field, the fluid flow is induced in the fluidic channel.

In example embodiments, the first electrode and the second electrode are configured so that, on application of the AC electric field, a first flow rate of fluid over the first electrode is different, e.g., has a different magnitude, from a second flow rate of fluid over the second electrode. Thereby, a sum of the first flow rate and the second flow rate, acting in opposite directions, is nonzero, thereby contributing to the fluid flow in the fluidic channel.

AC electroosmosis as is provided by several of the embodiments described herein may induce a plug flow, i.e., a fluid flow having a substantially flat flow profile. The plug flow may yield a good resolution.

Figure 11:
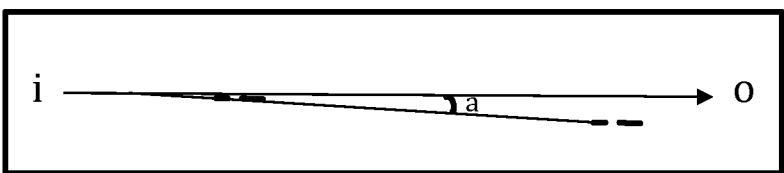
FIG. 11 schematically represents a relative orientation between a direction from the inlet to the outlet and a direction from a first electrode pair to a last electrode pair of an array, according to an example embodiment.

In example embodiments, the first array of electrode pairs has a length that is at least 80% of a distance between the inlet and the outlet. In embodiments, as schematically represented in FIG. 11, an angle (a) between a direction from a point of the first electrode pair of the first array and a corresponding point of the last electrode pair of the first array, and a direction from the inlet (i) to the outlet (o), is less than 10°, preferably less than 2°. In embodiments, a direction from a point of the first electrode pair of the first array and a corresponding point of the last electrode pair of the first array may be parallel to a direction from the inlet to the outlet. In embodiments, the array is aligned with (e.g., parallel to) a direction from the inlet to the outlet.

In example embodiments, the first electrode and the second electrode of each pair of electrodes are oriented so that an angle between a direction from the inlet to the outlet, and a direction in which a net flow is generated by the pair of electrodes, is smaller than 10°, preferably smaller than 2°. In embodiments, the first electrode and the second electrode of each pair of electrodes are oriented such that a direction from the inlet to the outlet is parallel to a direction in which a net flow is generated by the pair of electrodes. As such, a direction in which the electrode pairs generate a flow may be the same as the direction from inlet to outlet. By having each pair of electrodes generate a flow of fluid in a direction from the inlet to the outlet, each pair of electrodes may efficiently contribute to the plug flow from the inlet to the outlet. In embodiments, each pair of electrodes is aligned with a direction from the inlet to the outlet.

In example embodiments, an angle between a surface (e.g., the largest surface) of the first electrode and a surface of the wall (e.g., on which the electrode lies) is less than 20°, preferably less than 10°, such as less than 2°. In embodiments, a surface (e.g., the largest surface) of the first electrode may be parallel to a surface (e.g., on which the electrode lies) of the wall. In embodiments, an angle between a surface (e.g., the largest surface) of the second electrode and a surface (e.g., on which the electrode lies) of the wall is less than 20°, preferably less than 10°, such as less than 2°. In embodiments, a surface (e.g. the largest surface) of the second electrode may be parallel to a surface (e.g. on which the electrode lies) of the wall. Such orientations are favourable for inducing the fluid flow in a direction from the inlet to the outlet.

In example embodiments, the fluidic channel has a width, e.g., a diameter, perpendicular to a direction from the inlet to the outlet, from 10 μm to 1000 μm, such as from 100 μm to 500 μm. In embodiments, the fluidic channel has a length from the inlet to the outlet of from 0.1 mm to 10 cm, such as from 1 mm to 2 cm. The fluidic channel may have any shape. For example, the fluidic channel may have a cross-section perpendicular to a direction from the inlet to the outlet that is circular, rectangular, triangular, or an irregular shape. The cross-section may have a uniform shape along the fluidic channel from the inlet to the outlet, but that is not required. In embodiments, an area of a cross-section perpendicular to a direction from the inlet to the outlet, has a standard deviation, along the fluidic channel from the inlet to the outlet, that is smaller than 20%, such as smaller than 10%, such as smaller than 5% than a mean area of the cross-section along the fluidic channel from the inlet to the outlet. For instance, the area of a cross-section perpendicular to a direction from the inlet to the outlet may be constant along the fluidic channel from the inlet to the outlet. It is a benefit of embodiments described herein that a uniform shape and uniform dimensions may result in a uniform fluid flow.

In example embodiments, preferably when the first actuation means comprises a single array of electrode pairs, in a cross-section of the fluidic channel through the first electrode and perpendicular to a direction from the inlet to the outlet, the first electrode covers at least 40%, preferably at least 50%, more preferably at least 60%, yet more preferably at least 70%, yet more preferably at least 80%, yet more preferably at least 90%, and most preferably 100% of the periphery of the cross-section. In embodiments, preferably when the first actuation means comprises a single array of electrode pairs, in a cross-section of the fluidic channel through the second electrode and perpendicular to a direction from the inlet to the outlet, the second electrode covers at least 40%, preferably at least 50%, more preferably at least 60%, yet more preferably at least 70%, yet more preferably at least 80%, yet more preferably at least 90%, and most preferably 100% of the periphery of the cross-section. This is beneficial in that a fluid flow is homogeneously induced over at least part of the wall, e.g., the part of the periphery of the cross-section comprising the electrode. Typically, the fluid flow may not be homogeneous near the electrodes, as the flow of the fluid over the first electrode and the second electrode is in an opposite direction. Furthermore, in a gap separating the first electrode from the second electrode, or a gap separating adjacent electrode pairs, the fluid may interact with the wall, and become retarded by the wall, which may result in a non-homogeneous fluid flow.

In example embodiments, the first actuation means may comprise a plurality of arrays of electrode pairs. Typically, the first actuation means comprises first conductors configured to electrically connect the plurality of arrays of electrode pairs to at least an AC power source in such a way that an AC electric field can be generated between a first electrode and a second electrode of each electrode pair of each array. In embodiments, the first conductors can be configured to electrically connect the plurality of arrays of electrode pairs to a same AC power source. In embodiments, the first conductors can be configured to electrically connect each of the plurality of arrays of electrode pairs to a different AC power source. These arrays are preferably parallel to each other. The arrays may be aligned with each other in such a way that each particular first electrode in an array has a corresponding first electrode in each of the other arrays at a same distance from the inlet, and each particular second electrode in an array has a corresponding second electrode in each of the other arrays at a same distance from the inlet. This is, however, not essential, and a plug flow may also be obtained when the arrays are aligned differently. If the arrays are not aligned, however, it is preferably if the adjacent corresponding first electrodes on adjacent walls of the fluidic channel do not electrically contact each other, and adjacent corresponding second electrodes on adjacent walls of the fluidic channel do not electrically contact each other. Any features of the plurality of arrays of electrode pairs may be independently as correspondingly described for the first array of electrode pairs.

In example embodiments, the fluidic channel has a rectangular cross-section through corresponding aligned first electrodes of the plurality of electrode arrays and perpendicular to a direction from the inlet to the outlet, wherein the first electrodes cover at least 90%, preferably the entirety, of each of the two longest sides of the rectangular cross-section, and the fluidic channel has a rectangular cross-section through corresponding aligned second electrodes of the plurality of electrode arrays and perpendicular to a direction from the inlet to the outlet, wherein the second electrodes cover at least 90%, preferably the entirety, of each of the two longest sides of the rectangular cross-section.

In example embodiments, the first actuation means comprises a second array of electrode pairs along a wall of the fluidic channel, parallel to the first array, and along a portion of the fluidic channel comprising the first array, wherein the first conductors are configured to electrically connect the first and the second array of electrode pairs to at least an AC power source in such a way that an AC electric field can be generated between a first electrode and a second electrode of each electrode pair of each array. In embodiments, at least an AC power source is connected to the first array of electrode pairs and at least an AC power source is connected to the second array of electrode pairs. A same or a different AC power source can be connected to each of the first array of electrode pairs. Preferably, the first array and the second array are diametrically on opposite sides of the fluidic channel. In embodiments, the fluidic channel has a rectangular cross-section comprising two opposite walls with a first width and two opposite walls with a second width smaller than the first width, and the first array of electrode pairs and the second array of electrode pairs are present on opposite walls with the first width. In embodiments, the first actuation means comprises an array of electrode pairs on each wall of the fluidic channel, along the same portion of the length of the channel and running parallel to each other. In embodiments, the fluidic channel comprises a first width, perpendicular to a direction from the inlet to the outlet, of the fluidic channel, and a second width, perpendicular to the first width and to a direction from the inlet to the outlet, of the fluidic channel, wherein the ratio from the first to the second width is at least 2, preferably at least 3, more preferably at least 4, even more preferably at least 5. These embodiments are examples where it suffices to only have arrays of electrode pairs on the widest walls of the fluidic channel, e.g., one or more arrays on each of the two widest walls of the fluidic channel.

In example embodiments where a plurality of electrode arrays is present, adjacent corresponding first electrodes on adjacent walls of the fluidic channel electrically contact each other, and adjacent corresponding second electrodes on adjacent walls of the fluidic channel electrically contact each other. The electrical connection between adjacent corresponding first electrodes (and/or between adjacent corresponding second electrodes) is covered by a dielectric material, preferably having a capacitance per unit area of at most $0.1$ $F/m^2$, more preferably at most $0.01$ $F/m^2$, even more preferably at most $0.001$ $F/m^2$, even still more preferably at most $0.0001$ $F/m^2$. The capacitance per unit area is calculated by dividing the dielectric constant of the dielectric material by its thickness. Actually, if electrical connection between adjacent corresponding first electrodes (and/or between adjacent corresponding second electrodes) are not covered by a dielectric material having a capacitance per unit area of at most $0.0001$ $F/m^2$, we will not speak of adjacent corresponding first (or second) electrodes since these adjacent electrodes will be considered as forming a single electrode. For instance, when using $SiO_2$ as the dielectric material, which has a relative permittivity of 3.9, the thickness of the dielectric layer is preferably at least 0.4 nm, more preferably at least 4 nm, even more preferably at least 35 nm, even still more preferably at least 350 nm. When using $Si_3N_4$ as the dielectric material, which has a relative permittivity of 7.5, the thickness of the dielectric layer is preferably at least 0.7 nm, more preferably at least 7 nm, even more preferably at least 70 nm, even still more preferably at least 700 nm. When using $HfO_2$ as the dielectric material, which has a relative permittivity of 16, the thickness of the dielectric layer preferably has a thickness of at least 1.4 nm, preferably at least 14 nm, even more preferably at least 140 nm, still even more preferably at least 1400 nm.

If the electrical connection between adjacent corresponding first (and/or second) electrodes is not covered by a dielectric material having a capacitance per unit area of at most $0.0001$ $F/m^2$ (e.g., is exposed to the inside of the fluidic channel), then the electrical connections can be considered active as electrodes and adjacent corresponding first (and/or second) electrodes on adjacent walls connected that way form a single electrode and cannot be considered as spatially separated but electrically connected distinct electrodes. In other words, the first actuation means will be considered as comprising a plurality of arrays of electrode pairs if adjacent corresponding first electrodes on adjacent walls of the fluidic channel do not electrically contact each other or contact each other with electrical connections covered by a dielectric material having a capacitance per unit area of at most 0.0001 $F/m^2$, and adjacent corresponding second electrodes on adjacent walls of the fluidic channel do not electrically contact each other or contact each other with electrical connections covered by a dielectric material having a capacitance per unit area of at most $0.0001$ $F/m^2$. Consequently, the first actuation means will be considered as comprising a single array of electrode pairs if adjacent corresponding electrodes elements on adjacent walls of the fluidic channel electrically contact each other with electrical connections not covered by a dielectric material or covered by a dielectric material having a capacitance per unit area of at most 0.0001 $F/m^2$. In other words, a set of electrically connected electrode elements and their electrical connections will be considered as being a single electrode if the electrode elements contact each other with electrical connections not covered by a dielectric material or covered by a dielectric material having a capacitance per unit area of at most 0.0001 $F/m^2$. In embodiments, in a cross-section of the fluidic channel through corresponding aligned first electrodes of a plurality of electrode arrays and perpendicular to a direction from the inlet to the outlet, the corresponding aligned first electrodes cover together at least 40%, preferably at least 50%, more preferably at least 60%, yet more preferably at least 70%, yet more preferably at least 80%, yet more preferably at least 90% of the periphery of the cross-section. In embodiments, in a cross-section of the fluidic channel through corresponding aligned second electrodes of a plurality of electrode arrays and perpendicular to a direction from the inlet to the outlet, the second electrodes cover together at least 40%, preferably at least 50%, more preferably at least 60%, yet more preferably at least 70%, yet more preferably at least 80%, yet more preferably at least 90% of the periphery of the cross-section. By covering a large area of the walls of the fluidic channel with electrodes, a plug flow may be obtained with a flat flow profile. Indeed, the fluid may interact with, and be retarded by, wall uncovered by electrodes, which may result in a difference between a fluid flow rate near the wall and a fluid flow rate in the centre of the fluidic channel. The larger the covered area, the closer the flow will resemble a plug flow.

In example embodiments, a mean gap between adjacent electrode pairs within each array is from 0.5 $\mu$m to 200 $\mu$m, preferably from 2 to 150 $\mu$m. Preferably, the gap is the same between every adjacent electrode pair of a particular array, and preferably of each array.

In example embodiments, a mean gap between adjacent first and second electrodes of a same pair is from 0.1 to 15 $\mu$m, preferably from 1 to 10 $\mu$m. Preferably, the gap is the same between adjacent first and second electrodes of each pair of a particular array, and preferably of each array.

Preferably, the ratio between, on one hand, the mean gap between adjacent electrode pairs, and, on another hand, the mean gap between adjacent first and second electrodes of a same pair, is from 5 to 20, preferably from 10 to 18, more preferably from 12 to 16, yet more preferably from 13 to 15, and most preferably 14.

In example embodiments, a length of a surface of the first electrode, along a direction from the inlet to the outlet, is from 1 $\mu$m to 250 $\mu$m, preferably from 1 $\mu$m to 30 $\mu$m, and a length of a surface of the second electrode, along a direction from the inlet to the outlet, is from 1 $\mu$m to 250 $\mu$m. The longer the length of the first and/or second electrode, the farther the AC electric field, generated between the first and second electrode, may extend into the fluidic channel. The AC electric field may locally distort the DC electric field of the DC electric field gradient. Therefore, it is preferred that the length of each electrode within the one or more arrays remains small, so that the DC electric field of the DC electric field gradient may only be distorted in the proximity of the first and second electrode. Furthermore, the fluid flow may be a plug flow over a large part of a cross-section taken along the length of the fluidic channel. In a region near the walls, however, the fluid flow may be non-continuous, due to fluid flowing in opposite directions over the first and second electrodes of each electrode pair. As the region may be proportional to the dimensions of the electrodes of the electrode pairs, the electrodes are preferably as short as possible along a direction from the inlet to the outlet.

In example embodiments, the electrode pairs comprise at least one of the following materials: a metal, indium tin oxide, or silicon. In embodiments, at least one wall of the fluidic channel is optically transparent, such as to electromagnetic radiation, i.e., light, having a wavelength of from 300 nm to 2700 nm, more preferably of from 300 nm to 1200 nm such as from 300 nm to 900 nm. In embodiments, at least one wall of the fluidic channel comprises silicate glass. In these embodiments, the electrode pairs on the optically transparent wall preferably comprise a transparent electrically conductive material (e.g., indium tin oxide). It a benefit of embodiments described herein that optical analysis may be performed on a particle, e.g. a first charged particle, present, e.g., focused, in the fluidic channel.

In example embodiments, a surface of the first and second electrodes may be directly exposed to the inside of the fluidic channel (without a dielectric layer in between the conductive material of the electrode and the inside of the fluidic channel). It is a benefit of embodiments described herein that the exposed surface may result in a large fluid flow by the AC electroosmosis, as for example shown in Squires and Bazant, J. Fluid Mech. 509 (2004) pages 217-252. In different embodiments, a dielectric layer, e.g., an oxide or nitride such as $SiO_2$, $HfO_2$, or $Si_3N_4$, covers the first and second electrodes. It is a benefit of such embodiments that Faradaic reactions may be suppressed on surfaces of the first and second electrodes. In embodiments, the dielectric layer has a capacitance per unit area larger than 0.0001 $F/m^2$, preferably larger than 0.001 $F/m^2$, more preferably larger than 0.01 $F/m^2$, even more preferably larger than 0.1 $F/m^2$. Typically, the capacitance per unit area of the dielectric layer present on the electrodes surface is combined with a dielectric thickness of at least 0.1 nm. It is a benefit of such embodiments that the fluid flow, induced by the electrode pairs, may be large, while at the same time, Faradaic reactions may be suppressed. For instance, when using $SiO_2$ as the dielectric material, which has a relative permittivity of 3.9, the thickness of the dielectric layer present on the electrodes is preferably smaller than 350 nm, more preferably smaller 35 nm, even more preferably smaller 4 nm, even still more preferably smaller than 0.4 nm. When using $Si_3N_4$ as the dielectric material, which has a relative permittivity of 7.5, the thickness of the dielectric layer is preferably smaller than 700 nm, more preferably smaller than 70 nm, even more preferably smaller than 7 nm, even still more preferably smaller than 0.7 nm. When using $HfO_2$ as the dielectric material, which has a relative permittivity of 16, the thickness of the dielectric layer is preferably smaller than 1400 nm, more preferably smaller than 140 nm, even more preferably smaller than 14 nm, still even more preferably smaller than 1.4 nm.

In example embodiments, the first actuation means may be configured for generating a DC electric field between the first electrode and the second electrode of each electrode pair in addition to the AC electric field generated between the first electrode and the second electrode of each pair. This is beneficial because it may allow the direction of the fluid flow to be reversed. Furthermore, in these embodiments, higher flow velocities may be obtained. In embodiments, a material composition of the first electrode may be different from a material composition of the second electrode. In embodiments, the electrochemical properties of a surface of the first electrode, facing the inside of the fluidic channel, may be different from the electrochemical properties of a surface of the second electrode, facing the inside of the fluidic channel. In embodiments, an area of a surface of the first electrode (closer to the outlet), the surface facing the inside of the fluidic channel, is at least 20% larger, preferably at least 100% larger, more preferably at least 300% larger, such as at least 600% larger, than an area of a surface of the second electrode (closer to the inlet), facing the inside of the fluidic channel. This difference in electrochemical properties is such that a concentration of ions of a first type and a concentration of ions of a second type above the surface of the first electrode is different than that above the surface of the second electrode. This difference may be implemented, for example: by introducing a dielectric layer on the surface of the first electrode and not on the surface of the second electrode; or by using an electrode material for the first electrode that is different from an electrode material for the second electrode, such that a rate of redox reactions is different for the first electrode than for the second electrode. The rate may, for instance, be different due to a difference in selectivity towards particular redox reactions, or due to one of the first or second electrode acting as a catalyst (meaning a lower charge transfer resistance and hence a higher reaction rate) towards a particular redox reaction.

In example embodiments, for each electrode pair, the maximum distance between a surface, e.g., a surface facing the inside of the fluidic channel, of the first electrode and the wall is at least 100 nm, preferably at least 1 µm larger than the maximum distance between a surface, e.g., a surface facing the inside of the fluidic channel, of the second electrode and the wall. In other words, for each electrode pair, the height of the first electrode measured perpendicularly to the wall is at least 100 nm, preferably at least 1 µm larger than the height of the second electrode measured perpendicularly to the wall. The AC electroosmotic flow over each electrode of a pair of electrodes may result in a vortex-shaped fluid flow above the electrode, or, when the difference in maximum distance is approximately the same size as a width of the second electrode, in a direction from the inlet to the outlet, at least a vortex-shaped fluid flow above the second electrode. A direction of the flow in the vortex farthest away from a surface of the electrode, i.e., at the top of the vortex, may be opposite to a direction of the flow in the vortex at the surface of the electrode, i.e., at the bottom of the vortex. In such embodiments, the AC electroosmotic fluid flow of the first and second electrodes typically do not counteract each other but reinforce each other. Such electrode configurations for AC electroosmotic fluid flow applications are, for example, described in Bazant and Ben, Lab Chip 6 (2006) pages 1455-1461, Urbanski and Bazant, Appl. Phys. Lett. 89 (2006) 143508, and Urbanski and Bazant, J. Coll. Interf. Sci. 309 (2007) pages 332-341.

In example embodiments, the first actuation means is configured for obtaining a DC voltage at, e.g., applying a DC voltage to, each electrode of the array of electrode pairs, that is within 0.02 V, preferably within 0.01 V, of a DC voltage of the DC electric field gradient in the channel at the location of the electrode. Such application of DC voltage may be passive, e.g., using capacitors, may be active, e.g., using a DC voltage source, or may be a combination of both. As the DC voltage of the DC electric field gradient is dependent on a location in the channel, a magnitude of the DC voltage that is to be obtained at different electrodes at different locations in the channel may be different. In embodiments, the first actuation means comprises a capacitor coupled to each electrode of the array of electrode pairs. This may result in a very small DC voltage difference between the electrodes and the local voltage in the fluidic channel. In embodiments, the first actuation means comprises at least one DC voltage source, possibly in combination with the capacitor, coupled to the electrodes of the array of electrode pairs. Each DC source may be coupled to a single electrode or to several electrodes. The DC voltage source may accommodate large DC offsets, for example larger than offsets that may be achieved with a capacitor. It is a benefit of these embodiments that, when a DC electric field difference between the electrode pairs and the fluidic channel is small, Faradaic reactions at the electrodes may be suppressed. In embodiments, a coupling capacitor may be implemented by covering the electrodes of the first actuation means with a dielectric material, which preferably comprises an oxide or a nitride, such as $HfO_2$, $SiO_2$, or $Si_3N_4$. In embodiments, the dielectric material has a capacitance per unit area larger than 0.0001 $F/m^2$, preferably larger than 0.001 $F/m^2$, more preferably larger than 0.01 $F/m^2$, even more preferably larger than 0.1 $F/m^2$. Typically, the capacitance per unit area of the dielectric material covering the electrodes surface is combined with a dielectric thickness of at least 0.1 nm.

In example embodiments, the array of electrode pairs comprises at least two groups of electrode pairs, wherein a frequency and/or an amplitude of the AC electric field generated between the first and second electrode of each electrode pair is different for each of the at least two groups of electrode pairs. The difference in generated AC electric field for different groups of electrode pairs allows additional fine-tuning or compensation of parasitics or distortions. For example, surfaces in between the electrodes of the electrode pairs may have a non-zero surface charge. The non-zero surface charge may induce a DC electroosmotic flow. Since the DC field strength varies, this DC electroosmotic flow may vary along the length of the channel, which may distort the plug flow of the AC electroosmosis. By adjusting the AC electric field or AC frequency for different groups of electrode pairs, such a distortion may be mitigated. Furthermore, differences between electrodes, such as differences in length of electrodes, or differences in applied effective fields due to non-conform circuitry, which are often inherent in manufacturing, may result in distortions from a non-ideal plug flow. Such distortions may also be mitigated in these embodiments.

In example embodiments, the second actuation means comprises at least two electrodes, and second conductors configured to electrically connect the at least two electrodes to a DC power source. In preferred embodiments, the at least two electrodes are Faradaic electrodes. In embodiments, an surface of the at least two electrodes, the surface facing the inside of the fluidic channel, may preferably comprise an inert metal such as platinum, ruthenium, gold, or ruthenium oxide. In embodiments, each of the at least two electrodes has a surface that is exposed to the fluidic channel. The Faradaic electrodes may convert electric current in the electrodes to ionic current in a fluid in the fluidic channel. It is a benefit of embodiments described herein that ionic current may flow between the at least two electrodes, which, at the same time, may not result in a build-up of charge at the at least two electrodes. Indeed, the build-up of charge at the electrodes could counteract the DC electric field generated by the at least two electrodes. In embodiments, a first electrode of the at least two electrodes is located at the inlet of the fluidic channel and a second electrode of the at least two electrodes is located at the outlet of the fluidic channel.

In embodiments, the second actuation means is configured so that a DC electric field having the smallest magnitude within the DC electric field gradient is at the first electrode, e.g., at the inlet. In embodiments, the second actuation means is configured so that a DC electric field having the largest magnitude within the DC electric field gradient is at the second electrode, e.g., at the outlet.

In example embodiments, the at least two electrodes comprise a counter electrode, such as a single counter electrode. The counter electrode may function as a counter electrode for each of the other electrodes, different from the counter electrode, amongst the at least two electrodes. In embodiments, the at least two electrodes are configured so that ionic current may flow between the counter electrode and each of the other electrodes amongst the at least two electrodes. In embodiments, each of the at least two electrodes may have a surface facing the inside of the fluidic channel, such as a surface exposed to the fluidic channel, that has a width of at least 1 μm, preferably at least 10 μm, and a length, perpendicular to the width, of at least 1 μm, preferably at least 10 μm. A larger area of a surface of an electrode may reduce a current density, and thereby Joule heating, at the surface of the electrode. Heating, such as Joule heating, may affect the first charged particle. For example, when the first charged particle is a protein, the heating may cause denaturation. In embodiments, the area of the largest surface of the counter electrode is at least twice as large, such as at least five times as large, such as at least ten times as large, as the area of the largest surface of the other electrodes amongst the at least two electrodes. For example, there may be fewer counter electrodes than other electrodes amongst the at least two electrodes, e.g., there may only be a single counter electrode. In that case, a large amount of ionic current may be converted to electric current, or vice versa, at the surface of the counter electrode, which may result in rapid heating at the counter electrode. It is a benefit of embodiments described herein that Joule heating at the surface of the counter electrode may be limited.

In example embodiments, the at least two electrodes of the second actuation means and the electrode pairs of the first actuation means comprise the same electrodes. In preferred embodiments, the electrode pairs of the first actuation means are different from the at least two electrodes of the second actuation means. It is a benefit of embodiments described herein that no or substantially no Faradaic reactions may occur at the electrode pairs. The Faradaic reactions could influence, e.g., partially or completely remove, the ionic layer induced on the surface of electrodes of the electrode pairs. Thereby, the AC electroosmotic flow may be affected, e.g., reduced.

The electric field E as dependent on location between the inlet and the outlet x may be described by $E(x)=I/(\sigma \cdot A)$, with I the ionic current in the fluidic channel, $\sigma$ the conductivity of a fluid in the fluidic channel, and A the cross-sectional area perpendicular to the direction from inlet to outlet of the fluidic channel (Koegler and Ivory, J. Chromatogr. A 229 (1996) pages 229-236). In embodiments, the second actuation means is configured for generating a gradient in ionic current in the fluidic channel, adapted for generating the DC electric field gradient. In embodiments, the second actuation means comprises an array of electrodes.

In example embodiments, the electric field gradient focusing device comprises a fluidic side-chamber, and a semipermeable membrane in a wall of the fluidic channel connecting the fluidic channel and the fluidic side-chamber, wherein the semi-permeable membrane is conductive to ions. The term "semi-permeability" as used for semi-permeable membranes in the context of the present disclosure is understood to mean that some molecules are transported at a different rate by the semi-permeable membrane than other molecules. For example, conductivity or permeability towards first molecules may be very high, while conductivity or permeability towards second molecules may be very low. What the first molecules and the second molecules may comprise may depend on the purpose of the semi-permeable membrane, and is described below with respect to several embodiments. The semi-permeable membrane may, instead, be called a permselective membrane or an ion-exchange membrane.

In example embodiments, at least one of the at least two electrodes, e.g., a counter electrode, is located in the fluidic side-chamber. In embodiments, the at least two electrodes of the second actuation means are located in the fluidic side-chamber. It is a benefit of embodiments described herein that Joule heating, which may occur at the at least two electrodes, such as at a counter electrode, may not influence a temperature of a fluid in the fluidic channel. In embodiments, the semi-permeable membrane is conductive to cations and to anions. It is a benefit of embodiments described herein that ionic current in the side-chamber, flowing between the electrodes of the at least two electrodes, may flow, through the semi-permeable membrane, into the fluidic channel. In embodiments, the semi-permeable membrane has an electric conductance per area to the ions of at least 0.1 S/m², at least 1 S/m², at least 100 S/m², at least 10000 S/m², at least 100000 S/m², or at least 1000000 S/m². In embodiments, the semi-permeable membrane has a permeability to the ions of at least $10^{-13}$ m/(s·Pa), or at least $10^{-10}$ m/(s·Pa).

In example embodiments, the cross-sectional area, taken perpendicular to a direction from the inlet to the outlet, of a portion, i.e., a first portion, of the side-chamber connected to the fluidic channel via a semi-permeable membrane closer to the inlet of the fluidic channel is larger than the cross-sectional area, taken perpendicular to a direction from the inlet to the outlet, of a portion, i.e., a second portion, of the side-chamber connected to the fluidic channel via a semi-permeable membrane closer to the outlet of the fluidic channel. In embodiments, the cross-sectional area of the side-chamber decreases, e.g., continuously decreases, between the inlet and the outlet. For example, the side-chamber may be taper-shaped. The difference in cross-section for different portions of the side-channel may result in the DC field gradient. It is a benefit of these embodiments that a difference in current generated by different electrodes of the second actuation means may not be required to generate the DC field gradient, which may result in a simple electric field gradient focusing device. In embodiments, a constant current may be created between a first electrode of the at least two electrodes located at the inlet of the fluidic channel and a second electrode of the at least two electrodes located at the outlet of the fluidic channel. In embodiments, a single semi-permeable membrane connects the side-chamber and the fluidic channel along the fluidic channel. In embodiments, the first portion and the second portion are connected to the fluidic channel via the single semi-permeable membrane, but through different portions of the single semi-permeable membrane between the inlet and the outlet of the fluidic channel. In different embodiments, at least two single semi-permeable membranes connect the side-chamber and the fluidic channel, at different locations between the inlet and the outlet of the fluidic channel. In embodiments wherein the at least two electrodes are present in the side-chamber, the difference in cross-sectional area between the first and second portion may result in a difference in DC electric field strength between the first and second portion in the side-chamber. Via the semi-permeable membrane connecting the first portion with the fluidic channel, and the semi-permeable membrane connecting the second portion with the fluidic channel, the difference in DC electric field strength may be present also in the fluidic channel. Thereby, a DC electric field gradient may be generated in the fluidic channel. In embodiments, the cross-sectional area, taken perpendicularly to a direction from the inlet to the outlet of the fluidic channel, of the side-chamber, gradually decreases from the inlet to the outlet of the fluidic channel. In embodiments, the side-chamber comprises at least three, such as at least ten, portions, each portion having a different cross-sectional area, taken perpendicular to a direction from the inlet to the outlet of the fluidic channel. In embodiments, each of the portions is connected to the fluidic channel via a semi-permeable membrane. It is a benefit of embodiments described herein that a large number of portions may result in a gradual change in DC electric field strength of the DC electric field gradient.

In example embodiments, the second actuation means is configured for generating a gradient in conductivity in the fluidic channel. In embodiments, the side-chamber comprises a side-chamber inlet and a side-chamber outlet, different from the semi-permeable membrane, configured so that a portion of a flow path from the side-chamber inlet to the side-chamber outlet is along the semi-permeable membrane. For example, the semi-permeable membrane has a permeability of, for instance, at least $10^{-13}$ m/(s·Pa), or least $10^{-10}$ m/(s·Pa), towards the fluid in the side-chamber. In example embodiments, the semi-permeable membrane may have a permeability of, for instance, at most $10^{-5}$ m/(s·Pa), towards the fluid in the side-chamber. In some examples, the semi-permeable membrane has a permeability, e.g., of at least $10^{-13}$ m/(s·Pa), or at least $10^{-10}$ m/(s·Pa), towards the fluid in the fluidic channel. In embodiments, the semi-permeable membrane may have a permeability of, for instance, at most $10^{-5}$ m/(s·Pa), towards the fluid in the fluidic channel. In embodiments, the conductivity gradient in the fluidic channel is due to a gradient of a concentration of a salt, i.e., ions of the salt, in the fluidic channel. In embodiments, the concentration of the salt is from 0.1 mM to 1000 mM, or from 10 mM to 100 mM. In embodiments, the conductivity of the fluid comprising the ions is from 0.000001 S/m to 1000 S/m, or from 0.001 S/m to 10 S/m. In embodiments, the salt comprises ions, typically inorganic ions, different from the first charged particle. In embodiments, the salt may be comprised in a buffer such as a physiological buffer or a low conductivity buffer. In some examples, the semi-permeable membrane has a conductance per area of at least 0.1 S/m$^2$, at least 1 S/m$^2$, at least 100 S/m$^2$, at least 10000 S/m$^2$, at least 100000 S/m$^2$, or at least 1000000 S/m$^2$ towards both ions of the salt. For example, a further fluid having a lower ionic concentration, e.g., a lower concentration of the salt, than the fluid may be introduced through the side-chamber inlet, flow along the fluidic channel, and be removed through the side-chamber outlet. Due to the salt flowing from the fluidic channel into the side-chamber, the concentration of the salt in a portion of the fluidic channel closer to the inlet may be larger than a concentration of the salt in portions farther from the inlet. Thereby, the gradient in concentration of the salt, hence in conductivity, may be generated in the fluidic channel. As a DC electric field may be larger in portions with a lower conductivity, the DC electric field strength may increase from the inlet towards the outlet.

In example embodiments, the electric field gradient focusing device comprises a plurality of side-chambers, and an array of semi-permeable membranes along a wall of the fluidic channel, each semi-permeable membrane connecting one of the plurality of side-chambers with the fluidic channel, wherein the second actuation means comprises an electrode in each of the plurality of side-chambers. Due to the semi-permeable membrane, an analyte in the fluidic channel may not flow into the side-chamber. Therefore, the analyte may not be reduced or oxidized at the electrode. Furthermore, when the fluid comprises water, reduction or oxidation of the water may not result in air bubbles in the fluidic channel.

In example embodiments, the second actuation means is configured for applying a larger electric field to a part of the fluidic channel closer to the outlet of the fluidic channel than to any part of the fluidic channel farther from the outlet. For example, a voltage difference between adjacent electrodes of the second actuation means is larger for adjacent electrodes connected to the fluidic channel through a semi-permeable membrane situated closer to the outlet of the fluidic channel than for any adjacent electrodes situated farther from the outlet.

In example embodiments, the electric field gradient focusing device comprises a plurality of further side-chambers, and an array of further semi-permeable membranes along a wall of the fluidic channel, each further semi-permeable membrane connecting one of the plurality of further side-chambers with the fluidic channel, wherein the second actuation means comprises an electrode in each of the plurality of further side-chambers. In embodiments, the semi-permeable membranes and the further semi-permeable membranes are situated in a same portion of the fluidic channel. In embodiments, the semi-permeable membranes and the further semi-permeable membranes are situated as far as possible from each other, e.g., on opposite sides, e.g., opposite walls, of the fluidic channels. It is a benefit of embodiments described herein that the DC electric field gradient may be uniform throughout a cross-sectional area perpendicular to a direction from the inlet to the outlet.

In example embodiments, the array of semi-permeable membranes has a conductance per area of at least 0.1 S/m$^2$, at least 1 S/m$^2$, at least 100 S/m$^2$, at least 10000 S/m$^2$, at least 100000 S/m$^2$, or at least 1000000 S/m$^2$, at 30° C. and 70% relative humidity towards cations and a conductance per area towards anions that is at least 10 times, or at least 100 times, lower at 30° C. and 70% relative humidity than the conductance per area towards cations for the array of semi-permeable membranes, and the array of further semi-permeable membranes has a conductance per area of at least 0.1 S/m$^2$, at least 1 S/m$^2$, at least 100 S/m$^2$, at least 10000 S/m$^2$, at least 100000 S/m$^2$, or at least 100000 S/m$^2$, at 30° C. and 70% relative humidity towards anions and a conductance per area towards cations that is at least 10 times, or at least 100 times, lower at 30° C. and 70% relative humidity than the conductance per area towards anions for the array of further semi-permeable membranes. In embodiments, the array of semi-permeable membranes has a larger conductivity towards cations than the array of further semi-permeable membranes and a lower conductivity towards anions than the array of further semi-permeable membranes. In embodiments, the cations may comprise one or more of K$^+$, Na$^+$, Cu$^{2+}$, and Al$^{3+}$. In embodiments, the anions may comprise Cl$^-$. In embodiments, the second actuation means is configured for generating a DC voltage bias between electrodes in the side-chambers and electrodes in the further side-chambers. In embodiments where the conductivity of the first array is larger toward the anions than toward the cations, the DC voltage bias can be such that electrodes in the side-chambers are at a larger potential than electrodes in the further side-chambers. In embodiments where the conductivity of the first array is larger toward the cations than toward the anions, the DC voltage bias can be such that electrodes in the side-chambers are at a smaller potential than electrodes in the further side-chambers. The DC voltage bias may induce a movement of cations into the side-chambers and of anions into the further side-chambers. It is a benefit of embodiments described herein that this may reduce an ionic strength in the fluidic channel, i.e., this may increase an electric field in the fluidic channel.

Any features of any of the above embodiments of the first aspect may be, with appropriate modifications and where appropriate, applied to a different aspect of the present disclosure.

In a second aspect, the present disclosure includes a method for separating a first charged particle from one or more other charged particles in a mixture of charged particles present in a fluid, including: a) introducing the fluid into a fluidic channel having an inlet and an outlet for the fluid, b) during a first period of time, inducing a fluid flow in the fluidic channel from the inlet to the outlet via AC electroosmosis, and c) during a second period of time that overlaps with the first period of time such that steps b) and c) overlap in time, generating a DC electric field gradient along at least part of the fluidic channel, wherein the fluidic channel comprises a focus region for the first charged particle, an upstream region contiguous to the focus region, and a downstream region contiguous to the focus region, wherein the DC electric field gradient comprises a first DC electric field in the upstream region, a third DC electric field in the downstream region, and a second DC electric field, intermediate between the first and third DC electric field, in the focus region, and wherein the first DC electric field, the third DC electric field, and the fluid flow are adapted so as to translocate the first charged particle towards the focus region.

The first DC electric field in the upstream region can be larger than the second DC electric field in the downstream region.

The first charged particle is charged so as to enable an electrophoretic force, due to a DC electric field, to be exerted on the first charged particle. The charge may be positive or negative. Typically, the mixture of charged particles comprises a plurality of first charged particles, that is, of a same type. In these embodiments, each of the plurality of first charged particles may be induced to move towards the focus region for the first charged particle.

In example embodiments, a DC electric field strength within the DC electric field gradient increases in a direction from the inlet to the outlet of the fluidic channel, at least in part of the fluidic channel comprising the upstream region, the focus region, and the downstream region. In embodiments, the DC electric field is oriented such that the DC electric field exerts an electrophoretic force on the first charged particle in a direction from the outlet to the inlet. In embodiments, an angle between a direction of the DC electric field and a direction from the inlet to the outlet is at most 20°, such as at most 50. In example embodiments, the direction of the DC electric field is along and may be parallel to the direction from the inlet to the outlet.

A net force acting on the first charged particle may comprise, e.g. consist of, a drag force resulting from the fluid flow due to AC electroosmosis and an electrophoretic force resulting from a DC electric field. The drag force may depend on a size and structure of the first charged particle, on a fluid flow rate, and on a composition of the fluid. The electrophoretic force may depend on the DC electric field strength and direction, and sign and magnitude of the charge on the first charged particle.

When the first charged particle is present in the upstream region, a net force acting on the first charged particle may be directed towards the focus region. Herein, the net force may comprise a drag force resulting from the fluid flow and an electrophoretic force resulting from the first DC electric field. In embodiments, when the first charged particle is present in the focus region, a net force acting on the first charged particle may be such that the first charged particle remains in the focus region. Herein, the net force may comprise a drag force resulting from the fluid flow and an electrophoretic force resulting from the second DC electric field. When the first charged particle is present in the downstream region, a net force acting on the first charged particle may be directed towards the focus region. Herein, the net force may comprise a drag force resulting from the fluid flow and an electrophoretic force resulting from the third DC electric field. Thereby, the first charged particle, and particles of a same type as the first charged particle, may be induced to translocate towards the focus region, and, subsequently, remain in the focus region.

In example embodiments, a movement of the first charged particle in the focus region is dominated by Brownian motion. In embodiments, the focus region comprises a portion in which the drag force resulting from the fluid flow and the electrophoretic force resulting from the second DC electric field, acting on the first charged particle, cancel, i.e., sum up to zero. In embodiments, the focus region has a thickness in the direction from the inlet to the outlet that is equal to a distance from a part of the portion closest to the inlet to a part of the portion closest to the outlet, in the direction from the inlet to the outlet. It is a benefit of these embodiments that the focus region may be narrow. For example, the fluid flow may be uniform throughout the fluidic channel, and the DC electric field strength may gradually increase in the fluidic channel from the inlet to the outlet. Furthermore, the DC electric field strength may be the same within a cross-section, through the portion, perpendicular to a direction from the inlet to the outlet. Thereby, the portion may be a plane, i.e., a flat surface, perpendicular to a direction from the inlet to the outlet, having an infinitely narrow thickness in the direction from the inlet to the outlet. In an alternative example, the fluid flow may be a non-ideal plug flow, e.g., a flow rate may vary within a cross-section perpendicular to a direction from the inlet to the outlet. For example, a flow-profile may be curved or have an irregular shape. Furthermore, the DC electric field may vary within a cross-section, through the portion, perpendicular to a direction from the inlet to the outlet. Thereby, the portion at which the drag force and an electrophoretic force sum up to zero may be a curved surface or an irregular surface.

In example embodiments, the second DC electric field being intermediate between the first and third DC electric field means that a strength of the second DC electric field is intermediate between a strength of the first and third DC electric field. In embodiments, the second DC electric field being intermediate between the first and third DC electric field implies that a maximum in DC electric field strength of the first DC electric field is contiguous to a minimum in DC electric field strength of the second DC electric field. In embodiments, the maximum in DC electric field strength of the first DC electric field and the minimum in DC electric field strength of the second DC electric field occur at a boundary separating the upstream region and the focus region. In embodiments, the second DC electric field being intermediate between the first and third DC electric field implies that a maximum in DC electric field strength of the second DC electric field is contiguous to a minimum in DC electric field strength of the third DC electric field. In embodiments, the maximum in DC electric field strength of the second DC electric field and the minimum in DC electric field strength of the third DC electric field occur at a boundary separating the focus region and the downstream region.

In example embodiments, a difference between a maximum and a minimum in DC electric field strength in the DC electric field gradient in a region of the fluidic channel, comprising (i.e. encompassing) the upstream region, the focus region, and the downstream region, is at least 10 V/m, at least 100 V/m, at least 1 kV/m, or at least 10 kV/m. In embodiments, a difference between a maximum and a minimum in DC electric field strength in the first DC electric field in the upstream region is at least 50 V/m. In embodiments, a difference between a maximum and a minimum in DC electric field strength in the third DC electric field in the downstream region is at least 50 V/m. It is a benefit of embodiments described herein that a broad range of DC electric field strengths is covered in the DC electric field gradient to focus the first charged particle, which may result in effective separation of the first charged particle. In embodiments, a difference between a maximum and a minimum in DC electric field strength in the second DC electric field in the focus region is at least 20 V/m.

In example embodiments, the DC electric field gradient has a mean slope in DC electric field strength of at least $1000 V/m^2$, at least $10000 V/m^2$, or at least $100000 V/m^2$, in a direction from the inlet to the outlet, at least in a part of the fluidic channel comprising the upstream region, the focus region, and the downstream region. It is a benefit of embodiments described herein that a large slope may result in a strong net force acting on the first charge particle towards the focus region. For example, whenever the first charged particle moves from the focus region into the upstream region or the downstream region, a strong "restoring" force may translocate the first charged particles back towards the focus region. Thereby, a negative effect of Brownian motion on the resolution may be suppressed. Hence, a large slope may result in a narrow peak width.

In example embodiments, each of the focus region, the upstream region, and the downstream region has a cross-section, perpendicular to a direction from the inlet to the outlet, that has an area that is at least 50%, such as at least 80%, at least 90%, or equal to, an area of a cross-section of the fluidic channel perpendicular to a direction from the inlet to the outlet. It is a benefit of embodiments described herein that the focus region, the upstream region, and the downstream region may be present over a large part of the width of the fluidic channel, perpendicular to a direction from the inlet to the outlet. Thereby, the first particle may have to move through the upstream region, the downstream region, and the focus region, on its movement from the inlet towards the outlet.

In example embodiments, an angle between a direction perpendicular to a plane separating the upstream region from the focus region, and a direction from the inlet to the outlet, is smaller than 20°, such as smaller than 5°. In embodiments, a direction perpendicular to a plane separating the upstream region from the focus region is parallel to a direction from the inlet to the outlet. In embodiments, an angle between a direction perpendicular to a plane separating the downstream region from the focus region, and a direction from the inlet to the outlet, is smaller than 20°, such as smaller than 5°. In embodiments, a direction perpendicular to a plane separating the downstream region from the focus region is parallel to a direction from the inlet to the outlet.

Without being bound by theory, effects such as Brownian motion may induce a movement of an individual first charged particle away from the focus region. For example, the movement may be towards, e.g., into, the upstream region or towards, e.g., into, the downstream region. That individual first charged particle is, subsequently, induced to move back, i.e., from the upstream region or the downstream region towards the focus region. However, as a result of these effects such as Brownian motion, the location of that individual first particle does not necessarily intersect with the focus region.

A peak, describing a particle density, or, equivalently, a probability that the first charged particle is present at a particular location, as a function of location along the fluidic channel, may have a maximum in the focus region. For example, the maximum may overlap with the portion of the focus region at which the drag force resulting from the fluid flow and the electrophoretic force resulting from the second DC electric field, acting on the first charged particle, sum up to zero. However, the wings of the peak may extend into the upstream and/or downstream region.

In example embodiments, the DC electric field gradient comprises a DC electric field strength that continuously increases, e.g. linearly or exponentially, in a direction from the inlet to the outlet. In embodiments, the DC electric field gradient forms a step profile in a direction from the inlet to the outlet. The step profile may comprise regions with increasing DC electric field strength separated by regions with continuous DC electric field strength. In other embodiments, the step profile may be such that the DC electric field comprises successive constant DC electric fields, increasing in value from the inlet to the outlet. In example embodiments, the DC electric field gradient comprises a steep region with a first slope, for example the first slope can have a mean slope of at least $50 kV/m^2$, between less steep regions with a second slope, lower than the first slope, wherein the second slope can have a mean slope lower than $10 kV/m^2$. In embodiments, the DC electric field gradient comprises a plurality of steep regions, separated from each other by less steep regions.

Typically, the mixture of charged particles comprises a plurality of charged particle types. In embodiments, the fluidic channel comprises a plurality of focus regions, each with a corresponding upstream and downstream region, wherein each focus region is for focusing a corresponding charged particle type amongst the plurality of charged particle types.

When the DC electric field gradient has a high slope along the complete length of the fluidic channel, a broad range of DC electric field strengths may be present in the DC electric field gradient. Thereby, a large amount of the plurality of charged particle types may be focused in the fluidic channel, each in a dedicated focus region, dedicated to the charged particle type. At the same time, due to the large slope, the different dedicated focus regions may be located close to each other. This may negatively affect a separation resolution. For example, it may be difficult to distinguish the different charged particle types. At the same time, a high resolution is preferred to achieve a narrow probability distribution. In an exemplary solution to this problem, the slope may at first be large, so that a plurality of peaks, each corresponding to a different type of charged particle, are focused together. Subsequently, the slope may be decreased, so that the peaks become separated from each other, and may be separately moved through the outlet. Thereby, a high resolution may be achieved.

In example embodiments, step a is performed before steps b and c. In different embodiments, steps a, b, and c may overlap in time, e.g., step a may be performed continuously. In other words, steps a and b, as well as steps a and c may overlap in time. When, for example, a plurality of first charged particles is present in the fluid, the first charged particles may be continuously separated from other charged particles in the fluid. In embodiments, steps b and c are performed until the first charged particle, e.g., typically a plurality of first charged particles, has reached the focus region. In embodiments, steps b and c are performed for at least 1 second, such as at least 10 seconds, e.g., at least 10 minutes.

In example embodiments, the method comprises a step d after step c of either interrupting step c or adapting the DC electric field gradient of step c, while keeping performing step b, so as to translocate the separated charged particle towards the outlet, and collecting the separated charged particle at the outlet. In embodiments, steps d and a overlap in time. In embodiments, the adapted DC electric field gradient and the fluid flow are adapted so that the focus region, i.e., original focus region, is removed and, instead, a new focus region is present in the fluidic channel, located between the original focus region and the outlet. In embodiments, the new focus region is at a distance from the outlet of less than 10%, or less than 5%, such as less than 1%, of the distance between the inlet and the outlet. In these embodiments, the fluidic channel comprises a new upstream region contiguous to the new focus region, and a new downstream region contiguous to the new focus region. In embodiments, a DC electric field in the new upstream region, a DC electric field in the new downstream region, and the fluid flow are adapted so as to translocate the first charged particle towards the new focus region. In these embodiments, a DC electric field in the new focus region is intermediate between the DC electric field in the new upstream region, and the DC electric field in the new downstream region. The translocation of the first charged particle towards the outlet may result in broadening of a peak describing a curve that is a particle density, or, equivalently, a probability that the particle is present at a particular location, as a function of location along the fluidic channel. It is a benefit of embodiments described herein that focusing is restored prior to movement of the first charged particles through the outlet. It is a benefit of embodiments described herein that a width of the peak may be small, or equivalently, a resolution may be high, when the first particle moves through the outlet. In embodiments, step d may be performed multiple times, for example each time with a different adapted DC electric field gradient. For example, when a plurality of charged particle types are each to be separated from the mixture of charged particles, focusing may be restored for each of the plurality of charged particle types. It is a benefit of embodiments described herein that good separation of each of the plurality of charged particle types from the mixture may be achieved.

In example embodiments, a wall of the fluidic channel has an absolute zeta potential smaller than 100 mV, or smaller than 10 mV It is a benefit of embodiments described herein that a DC electroosmotic flow, which may be inherently generated by the DC electric field of the DC electric field gradient, over the wall, when charged, may be negligible. This DC electroosmotic flow may distort the homogeneous plug flow.

In example embodiments, the first charged particle may be any particle that is charged, such as a charged nanoparticle, e.g. having a diameter of from 1 to 100 nm, or a charged molecule. In embodiments, the charge may be a positive charge or a negative charge. Usually, charged molecules have a charge having a magnitude of 1, 2, or 3, but the magnitude of the charge may be larger. In embodiments, the first charged particle and the one or more other charged particles are biomolecules. For instance, they may be nucleic acids (e.g., DNA or RNA strands) or proteins.

In example embodiments, the fluid comprises a solvent, which may be any solvent suitable for dispersing, e.g., dissolving, the first charged particles. In embodiments, the fluid comprises water. In embodiments, the fluid comprises zwitterionic molecules. In embodiments, each zwitterionic molecule comprises a positively charged group and a negatively charged group, wherein the negative charge may be the inverse of the positive charge. It is a benefit of embodiments described herein that the zwitterionic molecules may facilitate dispersing the charged particles (e.g., the proteins). It is a benefit of embodiments described herein that the zwitterionic molecules may not generate an electric current, e.g., when the zwitterionic molecules have no net charge. It is a benefit of embodiments described herein that the zwitterionic molecules may not impact an electric double layer on the electrodes of the electrode pairs.

In example embodiments, the fluid comprises ions, different from the charged first particle and the one or more other charged particles. Typically, these ions are not biomolecules. The ions may facilitate the dispersion of the first charge particle. The ions may facilitate the AC electroosmosis. The ions may contribute to pH buffering of the fluid. For example, the charge of the first charged particle may be pH-dependent.

In example embodiments, the fluid has a conductivity below 1000 μS/cm. It is a benefit of embodiments described herein that the low conductivity may result in a good AC electroosmosis. That is, the low conductivity may result in a thick electric double layer. It is a benefit of embodiments described herein that the low conductivity may limit Joule heating at the at least two electrodes for generating the DC electric field gradient.

In example embodiments, the fluid comprises a symmetric redox couple, comprising a first oxidation state having a first charge, and a second oxidation state having a second charge inverse of the first charge. It is a benefit of embodiments described herein that the symmetric redox couple may generate the ionic current. At the same time, charge accumulation at the electrodes may be prevented, as instead of deposition on reduction or oxidation, the charge on the symmetric redox couple is inverted. Thereby, the symmetric redox couple may move back and forth between electrodes.

In example embodiments, a wall of the fluidic channel comprises a semi-permeable membrane, and the semi-permeable membrane has a permeability to a solvent, e.g., water, of the fluid of at least $10^{-10}$ m/(s·Pa), or at least $10^{-13}$ m/(s·Pa), at 30° C. For example, the semi-permeable membrane may be used to separate a side-chamber from the fluidic channel, as described for embodiments of the first aspect. Benefits related to this embodiment of the second aspect may be similar as described with respect to the embodiments comprising the semi-permeable membrane of the first aspect.

In example embodiments, the semi-permeable membrane has a permeability to the first charged particle of at most $10^{-10}$ m/(s·Pa), at most $10^{-13}$ m/(s·Pa), or may be not permeable to the first charged particle. It is a benefit of embodiments described herein that the first charged particle remains confined in the fluidic channel.

In a third aspect, the present disclosure includes a microfluidic chip that includes the electric field gradient focusing device according to embodiments of the first aspect.

In a fourth aspect, the present disclosure includes a system for particle separation that includes: the electric field gradient focusing device according to embodiments of the first aspect, a fluidic input means configured for providing a fluid, and a controller comprising one or more processors (e.g., a microprocessor, a microcontroller, an ASIC) configured for setting the fluid flow generated by the first actuation means and for setting the DC electric field gradient generated by the second actuation means along the at least part of the fluidic channel.

In example embodiments, the fluidic input means may comprise fluidic components, e.g., a pump or reservoir, configured for providing the fluid through the inlet. The fluid typically comprises the mixture of charged particles comprising the first charged particle.

In example embodiments, the controller at least comprises an electrical signal source for allowing the electric field gradient focusing device to properly function.

In example embodiments, the electric field gradient focusing device comprises a detection component, e.g., an optical detection system, configured for monitoring or analyzing analytes after separation, e.g., at the outlet or in the fluidic channel, e.g., in the focus region. Thereby, for example, the first charged particle may be detected, which may be used for determining whether the first charge particle was successfully isolated or separated from the mixture.

Several example embodiments will now be described. It is clear that alternative embodiments can be configured according to the knowledge of persons skilled in the art without departing from the technical teachings of the present disclosure, the scope of the invention being defined by the claims.

Example 1: Electric Field Gradient Focusing Device

FIG. 1 is a vertical cross-section of an electric field gradient focusing device 1 according to an example embodiment. In this example, the electric field gradient focusing device 1 comprises a fluidic channel 11 having an inlet 111 and an outlet 112 at the ends of the fluidic channel 11. The fluidic channel 11 comprises a fluid comprising ions.

The electric field gradient focusing device 1 comprises first actuation means for inducing a fluid flow in the fluidic channel from the inlet 111 to the outlet 112 via AC electroosmosis. In this example, the first actuation means comprises a first array of electrode pairs 12 along a wall 113, in particular, a first wall 1131, i.e., a bottom wall, of the fluidic channel 11. In this example, the first actuation means comprises a second array of electrode pairs 12 along a second wall 1132, i.e., a top wall, opposite to the first wall 1131, of the fluidic channel 11. Each of the electrode pairs 12 comprises a first electrode 121 and a second electrode 122. In this example, for each of the electrode pairs 12 of the first array and the second array, an area of a surface of the first electrode 121, along a direction from the inlet 111 to the outlet 112, is larger than an area of a surface of the second electrode 122. Thereby, when an AC electric field is generated between the first electrode 121 and the second electrode 122, a flow of ions induced above the first electrode 121, in the direction of the outlet 112 of the fluidic channel 11, is larger than a flow of ions induced above the second electrode 122, in the direction of the inlet 111 of the fluidic channel 11. (The flow above the first 121 and second electrodes 122 is indicated by the curved arrows touching the electrodes.) Therefore, in this example, each of the electrode pairs 12 contributes to inducing a net flow of ions, hence of fluid, in the fluidic channel 11, from the inlet 111 to the outlet 112. The net flow is indicated by the straight arrows in the fluidic channel 11 oriented in a direction from left to right. As the fluid flow is induced at the walls, Poiseuille flow may be at least partially avoided. Hence, the fluid flow in the electric field gradient device of this example may have a flow profile that is flat compared to fluid flow in electric field gradient devices of the state of the art.

In this example, the electric field gradient focusing device comprises second actuation means configured for generating a DC electric field gradient along at least part of the fluidic channel 11. Vertical lines in the fluidic channel 11 represent DC equipotential lines. In this example, the second actuation means comprises electrodes 13 on the first wall 1131 and the second wall 1132, that are the same as the electrodes 121 and 122 of the first actuation means. In other words, the electrodes along the wall are used for both the first actuation means and for the second actuation means. However, alternatively, the electrodes 13 of the second actuation means may be different from the electrode pairs 12 of the first actuation means, and may, for example, be interspersed between, i.e., alternating with, the electrode pairs 12 of the first actuation means. The second actuation means further comprises a counter electrode (not shown).

Figure 2:
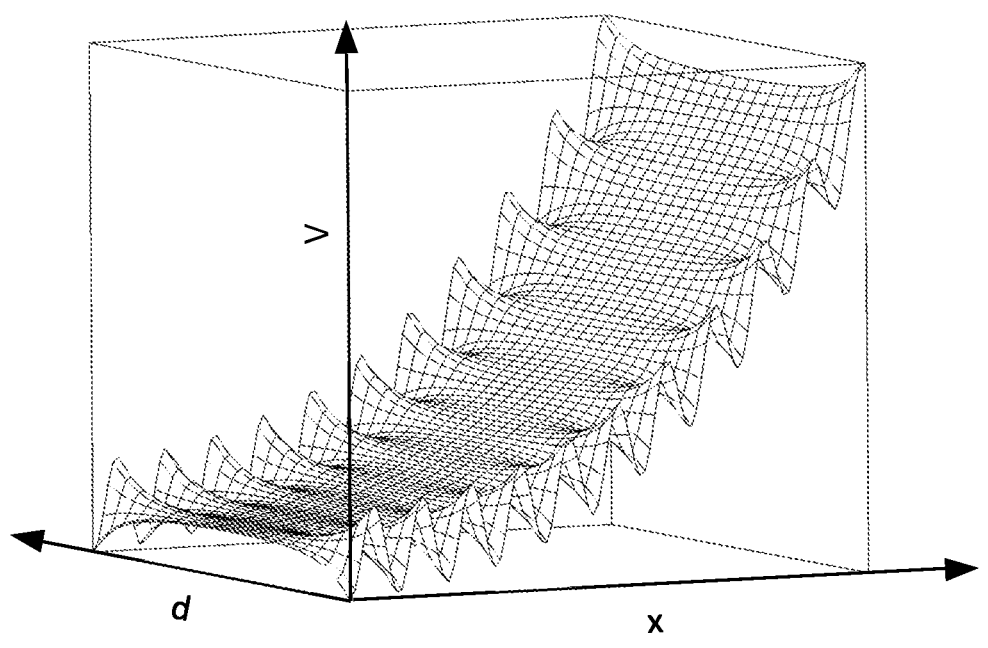
FIG. 2 is a plot of a voltage as dependent on location in a fluidic channel according to an example embodiment.

Reference is made to FIG. 2, where a voltage V, due to the DC electric field and the AC electric field combined, is plotted as a function of location x along the flow direction, and as a function of a location in a direction perpendicular to the flow direction d, e.g., along the height or width, in the fluidic channel (see also FIG. 1, where the directions of x and d are indicated). Herein, the flow direction is in the direction from the inlet to the outlet of the electric field gradient focusing device. As is clear from the plot, the AC electric field may disturb the DC electric field gradient. Therefore, the AC electric field can be limited to a region in the proximity of the walls of the fluidic channel. This may, for instance, be achieved by using first and second electrodes having a small surface area, and by limiting a size of a gap between the first and second electrodes of each electrode pair.

Figure 3:
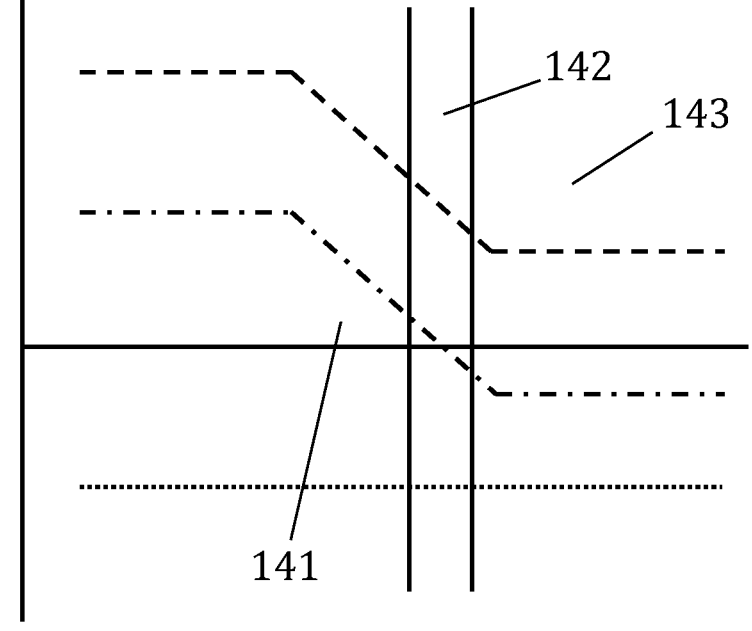
FIG. 3 is a plot of a force acting on a charged particle as a function of location in a fluidic channel according to an example embodiment.

Reference is made to FIG. 3, where a force acting on a charged particle in the fluidic channel is plotted as a function of location along the flow direction in the fluidic channel. As the DC electric field is dependent on location in the fluidic channel, also an electrophoretic force (dashed curve) acting on a first charged particle in the fluidic channel is dependent on location in the fluidic channel. At the same time, as the fluidic channel of this example has a uniform cross-section, a drag force (dotted curve) acting on the first charged particle as a function of location along the flow direction is uniform at each location. A net force (dashed-dotted curve) acting on the first charged particle is (ignoring further forces such as molecular forces giving rise to Brownian motion), in this example, equal to the sum of the electrophoretic force and the drag force. In this example, the fluidic channel comprises a focus region 142, an upstream region 141 contiguous to the focus region 142, and a downstream region 143 contiguous to the focus region 142. The DC electric field gradient comprises a first DC electric field in the upstream region 141, a third DC electric field in the downstream region 143, and a second DC electric field, intermediate between the first and third DC electric field, in the focus region 142. As is clear from the plot, in this example, the first DC electric field, the third DC electric field, and the fluid flow are adapted so as to translocate the first charged particle towards the focus region 142. In this example, in the upstream region 141, a force acts in the direction from the inlet to the outlet (positive force). In this example, in the downstream region, a force acts in the direction from the outlet to the inlet (negative force), i.e., towards the focus region.

Figure 4A:
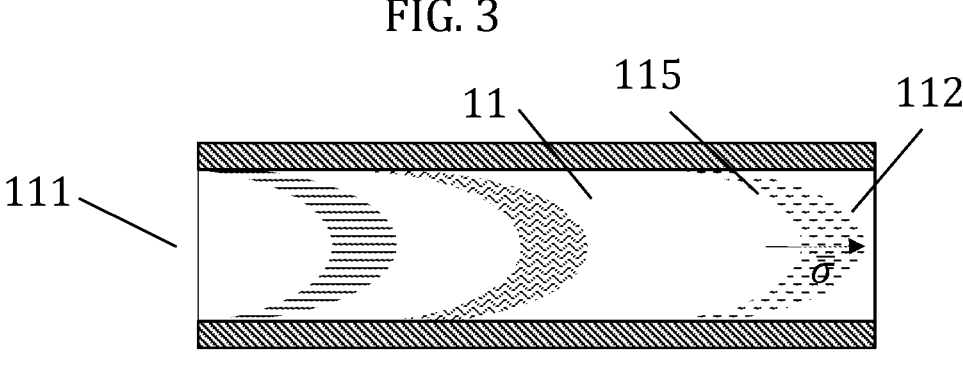
FIG. 4A is a schematic representation of a fluidic channel of an electric field gradient focusing device, wherein a fluidic flow is a pressure-driven flow, according to an example embodiment.

Example 2: Comparison of a Particle Distribution Achieved Via Embodiments of the Present Disclosure with the State of the Art Reference is made to FIG. 4A, which, schematically, shows a fluidic channel 11. The fluidic channel 11 comprises a fluid comprising a plurality of first charged particles. In the case of pressure-driven flow, which is generally used in the state of the art to induce a fluid flow, Poiseuille flow may be assumed, resulting in a parabolic flow profile, with a smaller fluidic flow rate near the walls of the fluidic channel 11. As the flow rate is smaller near the walls than in the center of the fluidic channel, a drag force acting on the first charged particles is also smaller near the walls than in the center. In this example, at the same time, a DC electric field gradient is generated in the fluidic channel 11. The DC electric field strength, i.e., an electrophoretic force acting on the first charged particles, increases from inlet to outlet. For first charged particles near the wall, the electrophoretic force required to balance the drag force, may be smaller than for first charged particles near the center of the fluidic channel. Therefore, first charged particles near the wall will focus towards a location closer to the inlet than first charged particles near the center.

Figure 4B:
FIG. 4B is a plot of a peak corresponding to a particle distribution as a function of location, achievable with the electric field gradient focusing device of the example of FIG. 4A.
Figure 4B:
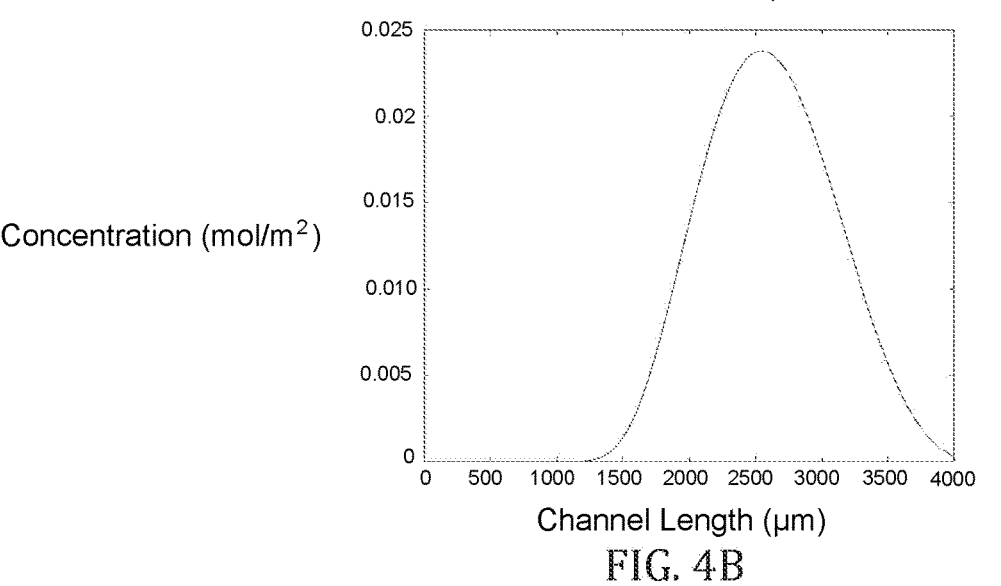

Reference is made to FIG. 4B, where a peak is plotted, corresponding to a particle distribution as a function of location along a direction from the inlet 111 to the outlet 112, after focusing of the first charged particles. The non-homogeneous flow rate throughout the fluidic channel, when pressure-driven flow is used, is apparent from very broad peak. In this example, the full-width-at-half-maximum (FWHM) of the peak is approximately 1500 µm.

Figure 5A:
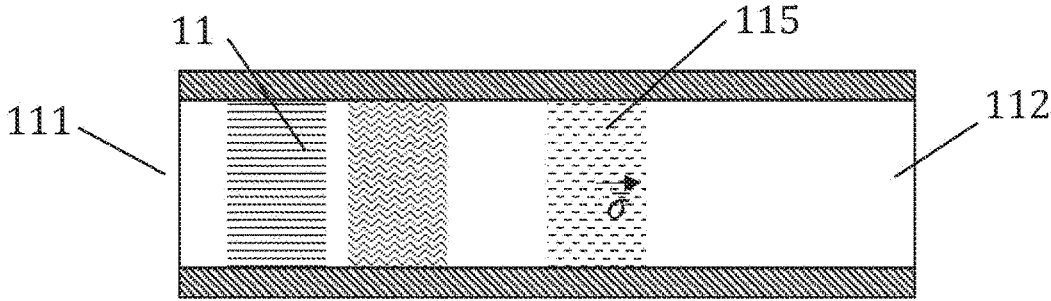
FIG. 5A is a schematic representation of a fluidic channel, wherein a fluidic flow is a pressure-driven flow, and wherein the fluidic channel comprises packing material, according to an example embodiment.
Figure 5B:
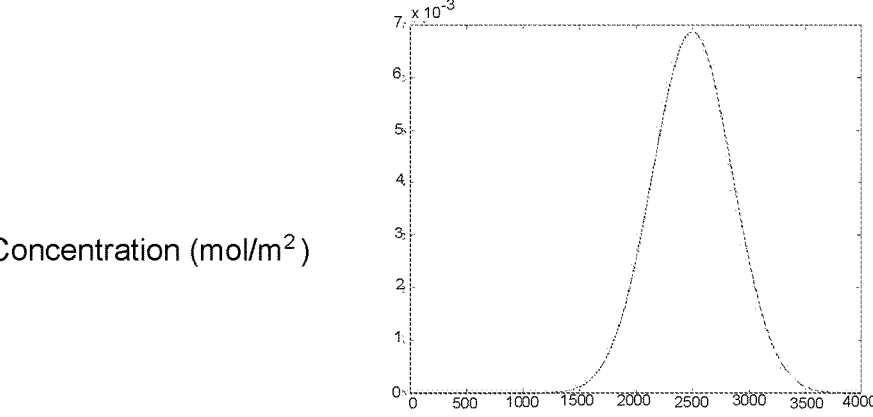
FIG. 5B is a plot of a peak corresponding to a particle distribution as a function of location, achievable with the electric field gradient focusing device of the example of FIG. 5A.

Reference is made to FIG. 5A. In the state of the art, a packing material is sometimes present in the fluidic channel 11 (see, for example, Delgado, Heat and mass transfer 42 (2006) pages 279-310). This may result in a flat flow profile, for example when a diameter of the channel 11 is at least ten times as large as a diameter of particles of the packing material, even when pressure-driven flow is used. However, the distribution of particles as a function of location along a direction from inlet 111 to outlet 112 may nevertheless be broadened, such as due to interactions of the first charged particle with the packing material. Reference is made to FIG. 5B, where the peak is plotted resulting from focussing using pressure-driven flow in combination with the packing material. The flat flow profile is evidenced by the narrow peak. In this example, the FWHM is approximately 1000 µm.

Figure 6A:
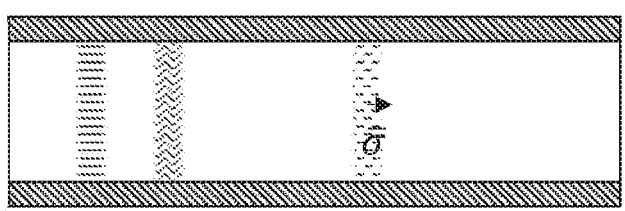
FIG. 6A is a schematic representation of a fluidic channel according an example embodiment.
Figure 6B:
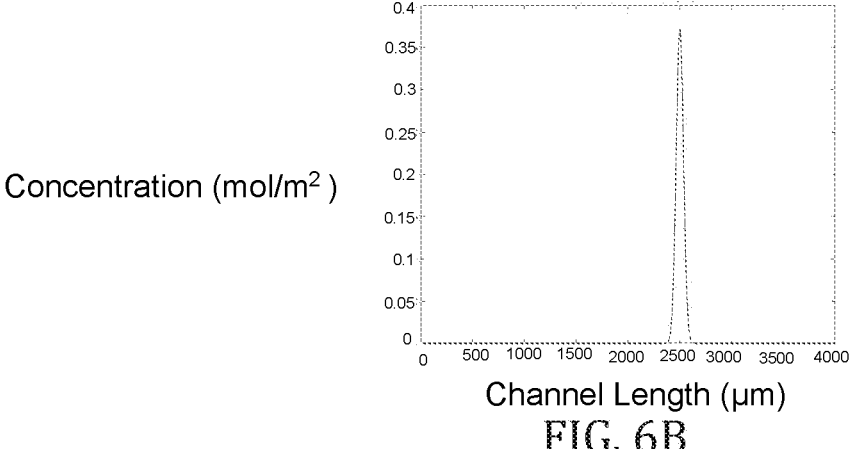
FIG. 6B is a plot of a peak corresponding to a particle distribution as a function of location, achievable with the electric field gradient focusing device according to an example embodiment.

Reference is made to FIG. 6A. According to embodiments of the present disclosure, fluid flow is induced by AC electroosmosis. No material is present in the fluidic channel with which the fluid may interact to become retarded. Reference is made to FIG. 6B. In this example, an FWHM is approximately 100 µm. This is smaller than the FWHM achieved in the examples above (that is, the resolution may be better) wherein pressure-driven flow is used to induce the fluid flow.

Figure 7:
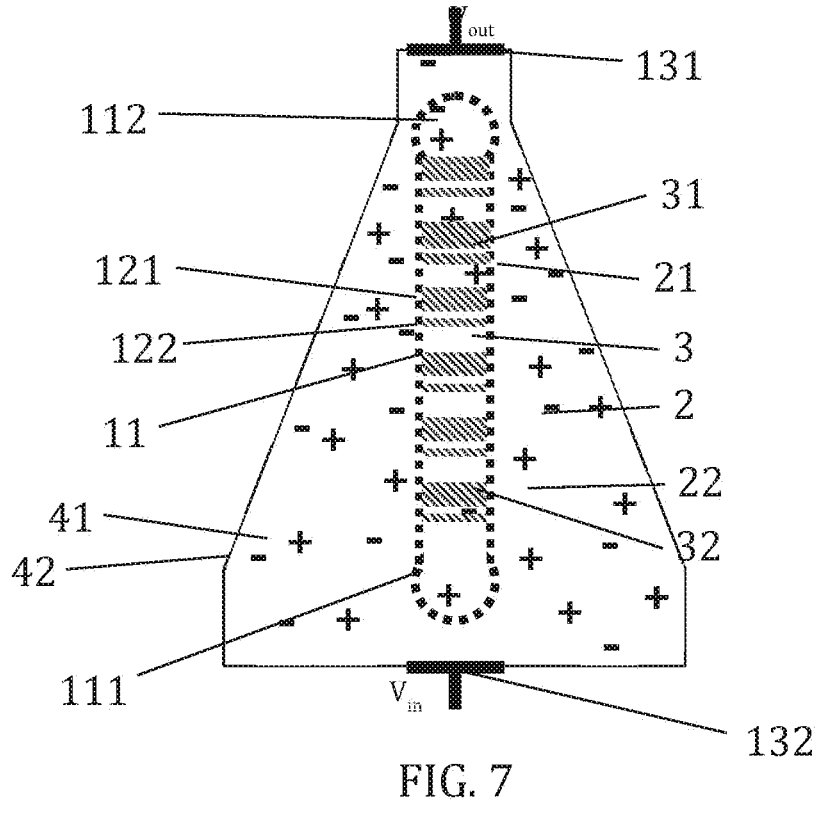
FIG. 7 is a horizontal cross-section along the length of the fluidic channel of an electric field gradient focusing device according to an example embodiment, comprising a side-channel with varying cross-sections.

Example 3: Electric Field Gradient Focusing Device Comprising a Side-Channel with Varying Cross-Section Reference is made to FIG. 7, which is a horizontal cross-section of an electric field gradient focusing device according to an example embodiment, for separating a first charged particle from a mixture of charged particles in a fluid. The electric field gradient focusing device comprises a fluidic channel 11. In this example, a first actuation means comprises an array of electrode pairs comprising first 121 and second 122 electrodes, on a wall of the electric field gradient focusing device. Furthermore, in this example, the electric field gradient focusing device comprises a side-chamber 2. A semi-permeable membrane 3 connects the side-chamber 2 with the fluidic channel 11 along the total length, and on both sides, of the fluidic channel 11. In this example, the semi-permeable membrane 3 is (e.g., equally) permeable to cations 41 and anions 42 dissolved in a fluid in the fluidic channel 11, and in a further fluid in the side-chamber 2. The fluidic channel 11 has a homogeneous cross-section between the inlet 111 and the outlet 112. In this example, the semi-permeable membrane 3 is not permeable to the fluid, and not to the further fluid. Thereby, the fluid flow in the fluidic channel 11 may be uniform along the fluidic channel 11. Furthermore, the semi-permeable membrane 3 is not permeable to the first charged particle that is to be separated from the fluid. As such, the first charged particle may remain confined in the fluidic channel 11. Thereby, the fluidic channel 11 can be used as the region where the charged particle is separated from the fluid. In this example, the side-chamber 2 has a width, and cross-section, that decreases along the fluidic channel from the inlet 111 to the outlet 112. Thereby, a width, and cross-section, of a portion 22 of the side-chamber 2 connected to the fluidic channel 11 via the semi-permeable membrane 31 closer to the inlet 111 of the fluidic channel 11 is larger than a width, and cross-section, of a portion 21 of the side-chamber 21 connected to the fluidic channel 2 via the semi-permeable membrane 32 closer to the outlet 112 of the fluidic channel 11. In this example, the electric field gradient focusing device comprises second actuation means comprising a first electrode 131 that is a Faradaic electrode, and a second electrode 132 that is a Faradaic electrode. A potential difference may be generated between the first 131 and second electrodes 132 of the second actuation means. The potential difference may induce an ionic current between the first 131 and second electrodes 132. The electric field, which, as mentioned previously, may be described by E(x) =I/(σ·A), increases with decreasing cross-sectional area A. Hence, the DC electric field magnitude induced by the potential difference between the first 131 and second electrodes 132 of the second actuation means, increases from the inlet 111 to the outlet 112. Thereby, a DC electric field gradient may be created in the fluidic channel 11. Although the first 131 and second electrode 132 are, in this example, located outside of the fluidic channel 11, they may, instead, be located inside of the fluidic channel 11. A benefit of such alternative configuration is that ions moving between the first 131 and second electrode 132 may not have to propagate through the semi-permeable membrane 3. Still alternatively, the first 131 and second 132 electrodes may be located in external reservoirs connected to the outlet 112 and inlet 111, respectively. A potential drawback of using a fluidic channel 11 separated from a side-chamber 2 by a semi-permeable membrane 3 may be that implementation of membrane 3 may be complicated. As an alternative, the side-chamber 2 may be filled with an ionically conductive gel, such as is described in Humble et al., Anal. Chem. 76 (2004) pages 5641-5648, and Kelly et al., Anal. Chem. 78 (2006) pages 2565-2570. The ionically conductive gel may be permeable to ions but not to a first charged particle, so that the first charged particle is confined in the fluidic channel 11. The gel typically has a large fluidic resistance for the fluid of the fluidic channel 11. In these embodiments comprising the gel, no membrane 3 may be required, as the gel in the side-chamber 2 and the fluid in the fluid channel 11 may not mix even in absence of the membrane 3. Embodiments wherein the side-chamber 2 is filled with the gel may exhibit improved ease of manufacturing. For example, the gel may be formed in a tapered shape, by UV-polymerization of acrylic monomers in a tapered cavity formed in a poly(methyl methacrylate) mould, as described in the above papers. As such, the gel may comprise acrylic polymers. Subsequently, the fluidic channel 11 may be formed by pulling a wire through the center of the tapered formed gel.

Figure 8:
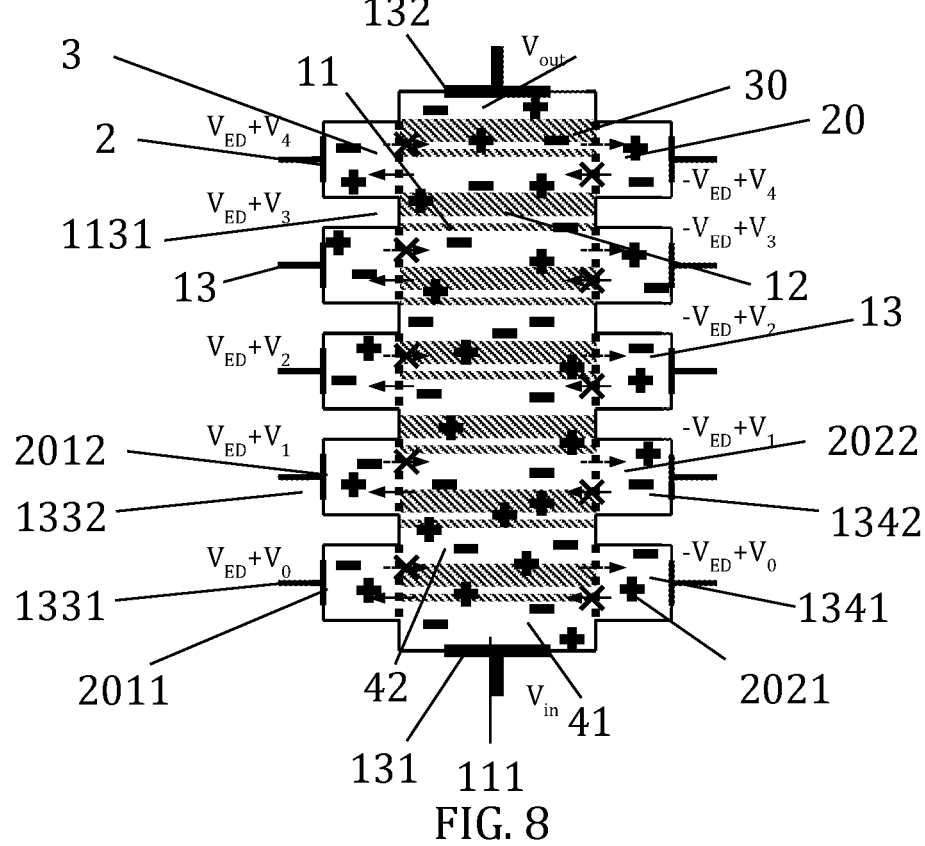
FIG. 8 is a horizontal cross-section along the length of the fluidic channel of an electric field gradient focusing device according to an example embodiment, comprising a plurality of side-chambers.

Example 4: Electric Field Gradient Focusing Device Comprising a Side-Channel for Generating a Conductivity Gradient Reference is made to FIG. 8, which is a horizontal cross-section of an electric field gradient focusing device according to an example embodiment. In this example, first actuation means comprise an array of electrode pairs 12 along a wall of the fluidic channel 11. In this example, the electric field gradient focusing device comprises a plurality of side-chambers 2. The electric field gradient focusing device further comprises an array of semi-permeable membranes 3 along a first wall 1131 of the fluidic channel 11. Each semi-permeable membrane 3 connects one of the side-chambers 2 of the plurality with the fluidic channel 11. A second actuation means comprises an electrode 13 in each of the plurality of side-chambers 2. The electric field gradient focusing device further comprises a plurality of further side-chambers 20, and an array of further semi-permeable membranes 30 along a wall of the fluidic channel 11. Each further semi-permeable membrane 30 connects one of the further side-chambers 20 of the plurality with the fluidic channel 11. The second actuation means comprises an electrode 13 in each of the further side-chambers 20. In this example, the wall comprising the semi-permeable membranes 3, is opposite to the wall comprising the further semi-permeable membranes 30. In this example, the second actuation means is configured for applying a smaller absolute field strength at electrodes 1331 and 1341 connected to the fluidic channel through a semi-permeable membrane situated closer to the inlet 111 of the fluidic channel than for any electrode situated farther from the inlet 111. In this example, the array of semi-permeable membranes 3 has a large conductivity, e.g., a conductance per area of at least 100 S/m², towards cations 41 and a low conductivity, e.g., a conductance per area of at 10 S/m², towards anions 42. In other words, the array of semi-permeable membranes 3 may selectively conduct cations with respect to anions, e.g., may be called a cation exchange membrane. The array of further semi-permeable membranes 30 has a large conductivity, e.g., a conductance per area of at least 100 S/m², towards anions 42 and a small conductivity, e.g., a conductance per area of at most 10 S/m², towards cations 41. In other words, the array of further semi-permeable membranes 30 may selectively conduct anions with respect to cations, e.g., may be called an anion exchange membrane. In FIG. 8, full arrows crossing the membrane 3 or 30 and directing to the left indicate movement of cations through the membrane 3 or 30. Dashed arrows directing to the right indicate movement of anions. A cross through the arrow indicates that such movement is limited by the semi-permeable membrane 3 or 30. At the same time, in this example, the second actuation means is configured for generating a DC voltage bias between electrodes 1331 and 1332 in the side-chambers 2 and electrodes 1341 and 1342 in the further side-chambers 20. The DC voltage bias can be such that cations 41 are induced to move into the side-chambers 2, and anions 42 are induced to move into the further side-chambers 20. As a result, a conductivity in the fluidic channel 11 may decrease from inlet 111 to outlet 112, i.e., a conductivity gradient may be generated. A potential difference may be generated between a first electrode 131 near the inlet 111 and a second electrode 132 near the outlet 112. Thereby, a DC electric field gradient may be generated between the inlet 111 and the outlet 112 of the fluidic channel 11. A potential may be applied to the electrodes 13 in the side-chambers 2 and in the further side-chambers 20 that matches the electric field at a location in the fluidic channel to which the side-chambers 2 and further side-chambers 20 are connected.

Figure 9:
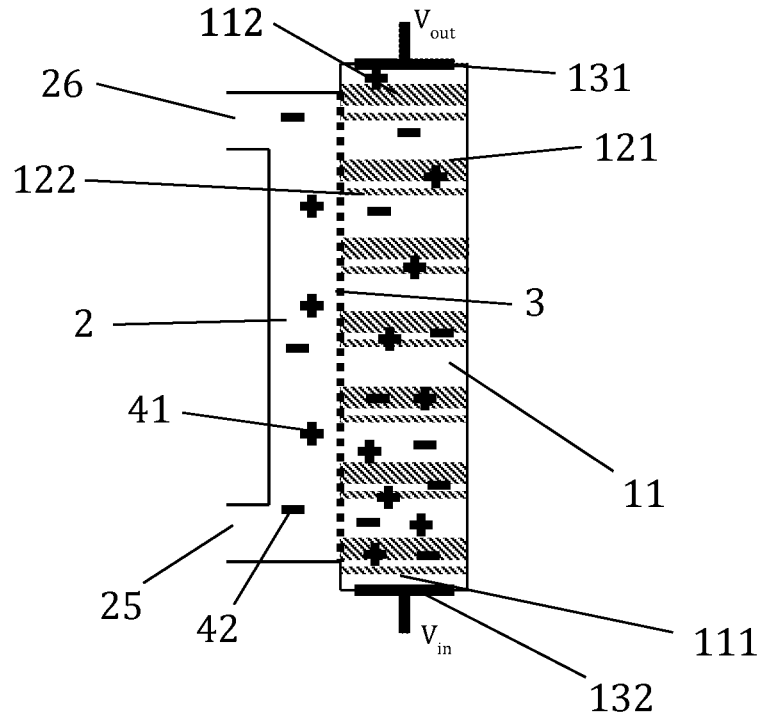
FIG. 9 is a horizontal cross-section along the length of the fluidic channel of an electric field gradient focusing device according to an example embodiment, for generating a conductivity gradient in the fluidic channel.

Example 5: Electric Field Gradient Focusing Device Comprising a Side-Channel for Generating a Conductivity Gradient Reference is made to FIG. 9, which is a horizontal cross-section of an electric field gradient focusing device according to an example embodiment. The electric field gradient focusing device comprises a fluidic channel 11. In this example, a first actuation means comprises an array of electrode pairs comprising first 121 and second 122 electrodes (only a fraction is shown), on a wall of the electric field gradient focusing device. In this example, the electric field gradient focusing device comprises a side-chamber 2. A semi-permeable membrane 3 connects the side-chamber 2 with the fluidic channel 11 along the total length of the fluidic channel 11. The side-chamber 2 comprises a side-chamber inlet 25 and a side-chamber outlet 26, different from the semi-permeable membrane 3. The semi-permeable membrane 3 is configured so that at least a portion of a flow path from the side-chamber inlet 25 to the side-chamber outlet 26 is along the semi-permeable membrane 3. In this example, the semi-permeable membrane 3 is permeable to anions 42 and cations 41 dissolved in the fluid, but not to particles, e.g., a first charged particle. The semi-permeable membrane 3 has a low permeability to fluid in the fluidic channel 11, and not to further fluid in the side-chamber 2. The further fluid is introduced via the side-chamber inlet 25, and comprises a concentration of ions that is lower than a concentration of ions in the fluid on introduction in the fluidic channel 11 via the inlet 111. As a result, there is a net movement of ions from the fluidic channel 11, through the semi-permeable membrane 3, into the side-chamber 2. Thereby, a gradient in ionic concentration may be generated in the fluidic channel 11. That is, the ionic concentration may be larger near the inlet 111 than near the outlet 112. Equivalently, the conductivity is larger near the inlet 111 than near the outlet 112. The second actuation means comprises a first Faradaic electrode 131 located near the outlet 112, and a second Faradaic electrode 132 located near the inlet 111. A potential may be applied between the first electrode 131 and the second electrode 132. The electric field, which, as mentioned previously, may be described by $E(x)=I/(\sigma \cdot A)$, increases with decreasing conductivity $\sigma$. Hence, the DC electric field magnitude induced by the potential difference between the first 131 and second electrodes 132 of the second actuation means, increases from the inlet 111 to the outlet 112. Thereby, a DC electric field gradient is effectively created in the fluidic channel 11.

Example 6: Different Configurations for Applying the AC Electric Field in the Electric Field Gradient Focusing Device In this example, different configurations for applying the AC electric field are discussed.

Figure 10A:
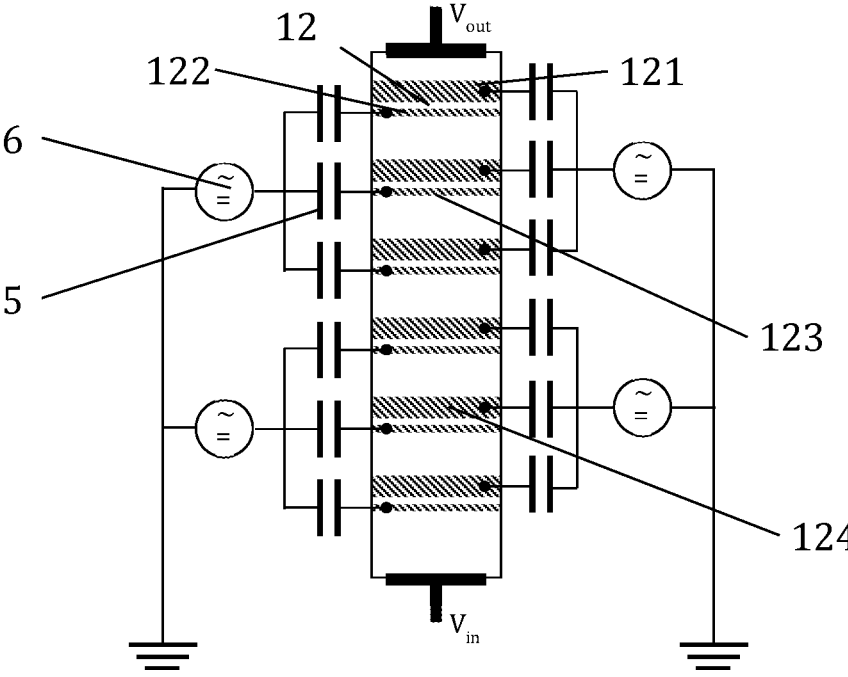
FIGS. 10A, 10B, 10C, 10D, and 10E are schematic representations of different configurations of an electric field gradient focusing device in accordance with example embodiments.

Reference is made to FIG. 10A, which is a schematic representation of an electric field gradient focusing device in accordance with example embodiments. In this example, the electric field gradient focusing device comprises an array of electrode pairs 12 comprising two groups 123 and 124 of electrode pairs 12. In this example, each group contains three electrode pairs 12, but instead, each group may contain any number of electrode pairs 12, e.g., at least one electrode pair 12. Instead, different groups 123 or 124 may comprise a different number of electrode pairs 12. In this example, each first electrode 121 of the electrode pairs is connected, over a capacitor 5, to a voltage source 6, and each second electrode 122 of the electrode pairs is connected, over a capacitor 5, to a different voltage source 6. Although, in this example (and in the examples below), the capacitor 5 is shown as a separate element in the connection between the electrodes of the array 12 and the voltage source 6, an alternative implementation may be by covering the elec-trodes of the array 12 with a dielectric. The first electrodes 121 of the two different groups 123 and 124 are connected to a different voltage source 6. Also the second electrodes 122 of the two different groups 123 and 124 are connected to a different voltage source 6. Thereby, a frequency and/or an amplitude of the AC electric field generated between the first 121 and second electrode 122 of each electrode pair may be different for each of the two groups 123 and 124 of electrode pairs 12. Each voltage source 6 may generate an AC voltage. By generating a different frequency or ampli-tude for the AC electric field between the first 121 and second electrode 122 of the electrode pairs 12 of the different groups 123 and 124, may allow for finetuning or compensation of parasitics or distortions of the plug flow in the fluidic channel. This configuration enables applying a 180 degrees phase-shifted AC voltage amplitudes to the first 121 and second electrodes 122 of each electrode pair 12, e.g., $+V_{AC}/2$ to the first electrodes 121 and $-V_{AC}/2$ to the second electrodes 122. Due to the capacitors 5, a DC voltage may be obtained at the electrodes 121 and 122 that is similar to, e.g., within 0.02V of, the voltage of the DC electric field gradient in the fluidic channel at the location of the elec-trodes 121 and 122. The voltage sources may further gen-erate a DC voltage at the respective electrodes 121 and 122, which may further ensure that the DC voltage at the respec-tive electrodes 121 and 122 is similar to the voltage of the DC electric field gradient in the fluidic channel at the location of the electrodes 121 and 122.

Figure 10B:
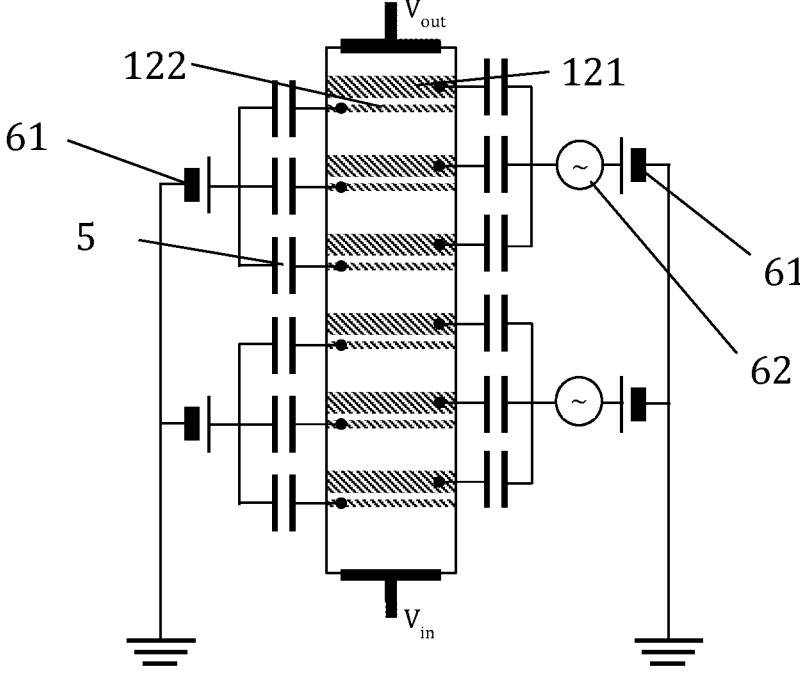

Reference is made to FIG. 10B, which is a schematic representation of an electric field gradient focusing device in accordance with example embodiments. Instead of applying the AC voltage to the first electrode 121 and to the second electrode 122 of each electrode pair, in this example, the AC voltage is applied only to the first electrode 121 of each electrode pair. In this example, the first electrodes 121 of the different groups are connected, over a capacitor 5, to a different AC voltage source 62, and to a different DC voltage source 61. Also, the second electrodes 122 of the different groups are connected, over a capacitor 5, to a different DC voltage source 61.

Figure 10C:
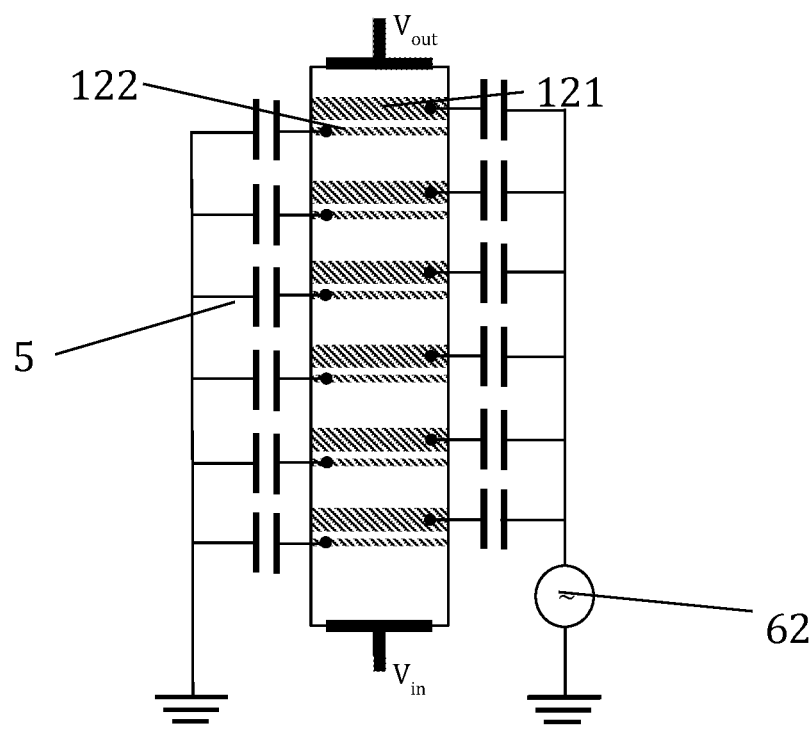

Reference is made to FIG. 10C. In a different, simple configuration of an electric field gradient focusing device in accordance with example embodiments, each electrode 121 and 122 is connected to a capacitor 5 for adapting the DC voltage of the electrode 121 or 122 to the local DC voltage of the DC electric field gradient in the fluidic channel. Furthermore, each first electrode 121 is connected, over the capacitor 5, to a common AC voltage source 62. Alterna-tively, the common AC voltage source could be connected to the second electrodes 122.

Figure 10D:
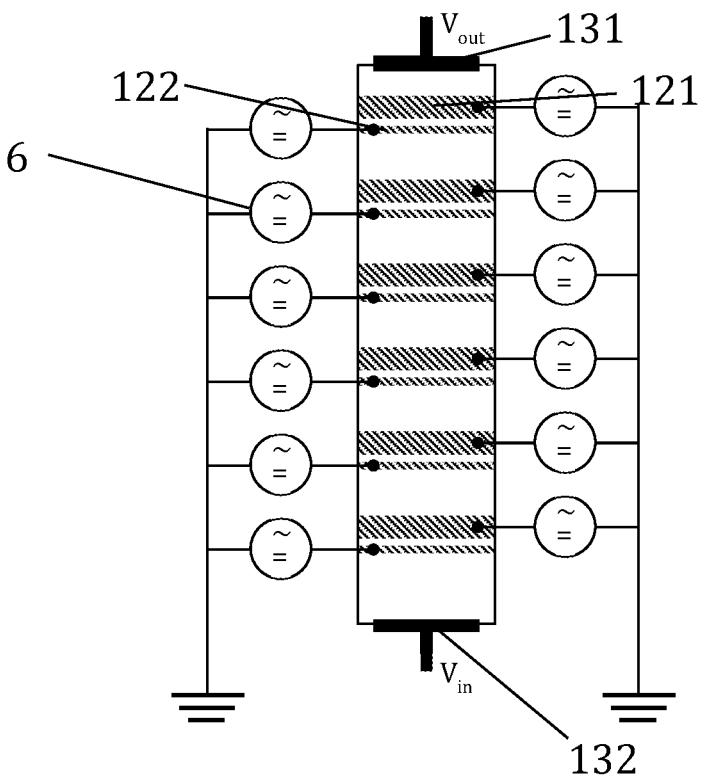

Reference is made to FIG. 10D. In a different configura-tion, each electrode 121 and 122 may be connected to a separate, dedicated AC and DC voltage source 6. In this configuration, the same electrodes may be used for gener-ating the AC electric field between the electrodes 121 and 122 of each pair, as for generating the DC electric field gradient, wherein the latter may be in conjunction with a DC electrode at the inlet 132 and a DC electrode at the outlet 131 of the fluidic channel. In this configuration, the fluid in the fluidic channel can have a low-conductivity, for limiting the DC currents through the fluidic channel, and thus the amount of redox reactions that may be needed at the DC electrodes.

Figure 10E:
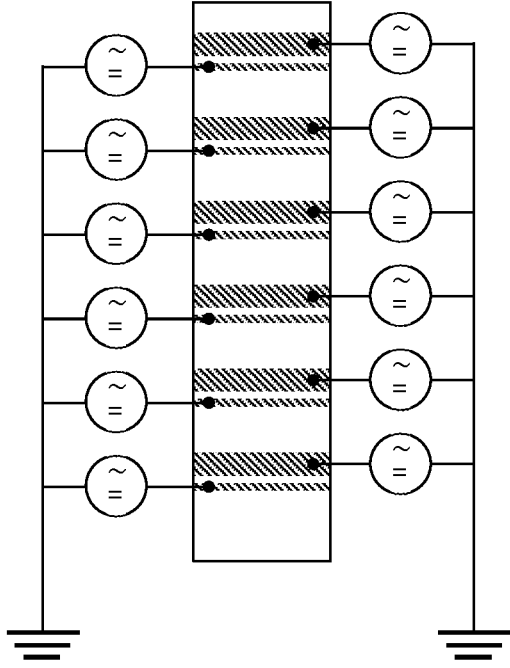

Reference is made to FIG. 10E, which is a similar configuration as that of FIG. 10D, but without the DC electrode at the inlet 132 and outlet 131 of the fluidic channel. Indeed, as the electrode pairs are connected to a DC voltage source, the electrodes at the inlet and outlet may no longer be needed for generating the DC electric field gra-dient.

It is to be understood that although specific embodiments, specific constructions, and configurations, as well as mate-rials, have been discussed herein for devices method of the present disclosure, various changes or modifications in form and detail may be made without departing from the scope of the present disclosure. Steps may be added or deleted to methods described herein.

What is claimed is:

1. An electric field gradient focusing device comprising:
   a fluidic channel having an inlet and an outlet for a fluid;
   a first actuator comprising a first plurality of electrodes adjacent to the fluidic channel;
   an AC voltage source that is operatively coupled to the first plurality of electrodes of the first actuator and configured to apply an AC voltage across the first plurality of electrodes, thereby inducing fluid flow in the fluidic channel via electroosmosis;
   a second actuator comprising a second plurality of elec-trodes adjacent to the fluidic channel;
   a plurality of pairs of side-chambers and a first array of semi-permeable membranes along a first wall of the fluidic channel and a second array of semi-permeable membranes along a second wall of the fluidic channel, the first wall and the second wall arranged on opposite sides of the fluidic channel, wherein the plurality of pairs of side-chambers are arranged such that a first side-chamber of a pair of side-chambers is connected to the first wall of the fluidic channel by a respective semi-permeable membrane of the first array of semi-permeable membranes, wherein a second side-chamber of the pair of side-chambers is connected to the second wall at a same position longitudinally along the fluidic channel as the first side-chamber by a respective semi-permeable membrane of the second array of semi-permeable membranes, wherein each semi-permeable membrane is conductive to ions, and wherein the second actuator comprises a pair of electrodes of the second plurality of electrodes in each of the plurality of pairs of side-chambers;

a DC voltage source that is operatively coupled to the second plurality of electrodes of the second actuator and configured to apply a DC voltage across the second plurality of electrodes, thereby generating a nonuniform DC electric field gradient longitudinally along at least part of the fluidic channel.

2. The electric field gradient focusing device of claim 1, wherein the first actuator comprises a first array of electrode pairs of the first plurality of electrodes along a wall of the fluidic channel, wherein the first actuator comprises first conductors configured to electrically connect the first array of electrode pairs to the AC voltage source in such a way that an AC electric field can be generated between a first electrode and a second electrode of each electrode pair, and wherein each electrode pair is composed of electrodes differing by at least one of their geometry or their elevation with respect to the wall of the fluidic channel.

3. The electric field gradient focusing device of claim 2, wherein the AC voltage source is connected to the first electrode of each of at least two electrode pairs of the first array of electrode pairs.

4. The electric field gradient focusing device of claim 2, wherein the first actuator is configured to apply a further DC voltage at each electrode of the first array of electrode pairs that is within 0.02 V of the DC voltage of the DC electric field gradient in the fluidic channel.

5. The electric field gradient focusing device of claim 2, wherein the first array of electrode pairs comprises at least two groups of electrode pairs, wherein a frequency and/or an amplitude of the AC electric field generated between the first and second electrodes of each electrode pair is different for each of the at least two groups of electrode pairs.

6. The electric field gradient focusing device of claim 2, wherein the second actuator comprises at least two electrodes of the second plurality of electrodes and second conductors configured to electrically connect the at least two electrodes to the DC voltage source, wherein the first array of electrode pairs of the first actuator are different from the at least two electrodes of the second actuator.

7. The electric field gradient focusing device of claim 6, wherein the at least two electrodes of the second actuator are Faradaic electrodes.

8. The electric field gradient focusing device of claim 1, wherein the first array of semi-permeable membranes has a conductance per area towards cations of at least 0.1 $S/m^2$ at 30° C. and 70% relative humidity and a conductance per area towards anions that is at least 10 times lower at 30° C. and 70% relative humidity than the conductance per area towards cations for the first array of semi-permeable membranes, and wherein the second array of semi-permeable membranes has a conductance per area towards anions of at least 0.1 $S/m^2$ at 30° C. and 70% relative humidity and a conductance per area towards cations that is at least 10 times lower at 30° C. and 70% relative humidity than the conductance per area towards anions for the second array of semi-permeable membranes.

9. A microfluidic chip comprising the electric field gradient focusing device of claim 1.

10. The electric field gradient focusing device of claim 1, wherein the pairs of electrodes in each of the plurality of pairs of side-chambers are each configured with one electrode in a respective first side-chamber and one electrode in a respective second side chamber that is paired with the respective first side-chamber, and wherein the second actuator and the DC voltage source are configured to generate a DC voltage bias between each pair of electrodes in each pair of side-chambers.

11. The electric field gradient focusing device of claim 10, wherein, for a given pair of side-chambers, the first side-chamber is configured to be at a higher voltage than the second side-chamber.

12. The electric field gradient focusing device of claim 10, wherein the plurality of pairs of side-chambers are arranged such that an absolute field strength of the DC voltage bias between the pairs of electrodes is lowest near the inlet of the fluidic channel and increases longitudinally along the fluidic channel.

13. A system for particle separation comprising:

an electric field gradient focusing device comprising:

a fluidic channel having an inlet and an outlet for a fluid;

a first actuator comprising a first plurality of electrodes adjacent to the fluidic channel;

a second actuator comprising a second plurality of electrodes adjacent to the fluidic channel; and a plurality of pairs of side-chambers and a first array of semi-permeable membranes along a first wall of the fluidic channel and a second array of semi-permeable membranes along a second wall of the fluidic channel, the first wall and the second wall arranged on opposite sides of the fluidic channel, wherein the plurality of pairs of side-chambers are arranged such that a first side-chamber of a pair of side-chambers is connected to the first wall of the fluidic channel by a respective semi-permeable membrane of the first array of semi-permeable membranes, wherein a second side-chamber of the pair of side-chambers is connected to the second wall at a same position longitudinally along the fluidic channel as the first side-chamber by a respective semi-permeable membrane of the second array of semi-permeable membranes, wherein each semi-permeable membrane is conductive to ions, and wherein the second actuator comprises a pair of electrodes of the second plurality of electrodes in each of the plurality of pairs of side-chambers;

a fluidic input configured to provide a fluid comprising a mixture of charged particles comprising a first charged particle; and a controller comprising one or more processors that are operatively coupled to the first plurality of electrodes of the first actuator and to the second plurality of electrodes of the second actuator and that are configured to: (i) apply an AC voltage across the first plurality of electrodes of the first actuator, thereby inducing a fluid flow in the fluidic channel via electroosmosis and (ii) apply a DC voltage across the second plurality of electrodes of the second actuator, thereby generating a nonuniform DC electric field gradient longitudinally along at least part of the fluidic channel.

14. The system for particle separation of claim 13, wherein the first actuator comprises a first array of electrode pairs of the first plurality of electrodes along a wall of the fluidic channel, wherein the first actuator comprises first conductors configured to electrically connect the first array of electrode pairs to an AC power source in such a way that an AC electric field can be generated between a first electrode and a second electrode of each electrode pair, and wherein each electrode pair is composed of electrodes differing by at least one of their geometry or their elevation with respect to the wall of the fluidic channel.

15. The system for particle separation of claim 14, wherein the second actuator comprises at least two electrodes of the second plurality of electrodes and second conductors configured to electrically connect the at least two electrodes to a DC power source, wherein the first array of electrode pairs of the first actuator are different from the at least two electrodes of the second actuator.

16. The system for particle separation of claim 13, wherein the first array of semi-permeable membranes has a conductance per area towards cations of at least 0.1 S/m$^2$ at 30° C. and 70% relative humidity and a conductance per area towards anions that is at least 10 times lower at 30° C. and 70% relative humidity than the conductance per area towards cations for the first array of semi-permeable membranes, and wherein the second array of semi-permeable membranes has a conductance per area towards anions of at least 0.1 S/m$^2$ at 30° C. and 70% relative humidity and a conductance per area towards cations that is at least 10 times lower at 30° C. and 70% relative humidity than the conductance per area towards anions for the second array of semi-permeable membranes.

17. A system for particle separation comprising:

an electric field gradient focusing device comprising:

a fluidic channel having an inlet and an outlet for a fluid;

a first actuator comprising a first plurality of electrodes adjacent to the fluidic channel;

an AC voltage source that is operatively coupled to the first plurality of electrodes of the first actuator and configured to apply an AC voltage across the first plurality of electrodes of the first actuator, thereby inducing fluidic flow in the fluidic channel via electroosmosis;

a second actuator comprising a second plurality of electrodes adjacent to the fluidic channel;

a DC voltage source that is operatively coupled to the second plurality of electrodes of the second actuator and configured to apply a DC voltage across the second plurality of electrodes of the second actuator, thereby inducing a DC electric field gradient longitudinally along at least part of the fluidic channel;

a side-chamber having an inlet and an outlet for a fluid, wherein the side-chamber extends longitudinally along a length of the fluidic channel; and a semi-permeable membrane that extends longitudinally along the length of the fluidic channel, separating the fluidic channel from the side-chamber;

a first fluidic input configured to provide a first fluid comprising a mixture of charged particles comprising a first charged particle and a first concentration of an ion to the inlet of the fluidic channel; and a second fluidic input configured to provide a second fluid to the inlet of the side-chamber, wherein the second fluid has a second concentration of the ion that is less than the first concentration of the ion in the first fluid and wherein providing the second fluid to the inlet of the side-chamber induces a gradient in concentration of the ion in the fluidic channel along at least a portion of the fluidic channel such that the DC electric field gradient along the portion of the fluidic channel is nonuniform, wherein the gradient in concentration of the ion is induced by ions from the fluidic channel passing through the semi-permeable membrane that connects the side-chamber to the fluidic channel, and wherein the semi-permeable membrane is not permeable to the first charged particle.

18. The system for particle separation of claim 17, wherein the first actuator comprises a first array of electrode pairs of the first plurality of electrodes along a wall of the fluidic channel, wherein the first actuator comprises first conductors configured to electrically connect the first array of electrode pairs to the AC voltage source in such a way that an AC electric field can be generated between a first electrode and a second electrode of each electrode pair, and wherein each electrode pair is composed of electrodes differing by at least one of their geometry or their elevation with respect to the wall of the fluidic channel.

19. The system for particle separation of claim 18, wherein the second actuator comprises at least two electrodes of the second plurality of electrodes and second conductors configured to electrically connect the at least two electrodes to the DC voltage source, wherein the first array of electrode pairs of the first actuator are different from the at least two electrodes of the second actuator.

\* \* \* \* \*